US011866941B2

United States Patent
Hilleringmann et al.

(10) Patent No.: US 11,866,941 B2
(45) Date of Patent: Jan. 9, 2024

(54) CONSTRUCTION FOIL

(71) Applicant: EWALD DÖRKEN AG, Herdecke (DE)

(72) Inventors: Ulrich Hilleringmann, Bad Wünneberg (DE); Dmitry Petrov, Paderborn (DE); Ilias Mokanis, Herdecke (DE); Henning Sand, Dortmund (DE); Thomas Bachon, Düsseldorf (DE)

(73) Assignee: EWALD DÖRKEN AG, Herdecke (DE)

( * ) Notice: Subject to any disclaimer, the term of this patent is extended or adjusted under 35 U.S.C. 154(b) by 426 days.

(21) Appl. No.: 17/271,842

(22) PCT Filed: Jul. 23, 2019

(86) PCT No.: PCT/EP2019/069782
§ 371 (c)(1),
(2) Date: Feb. 26, 2021

(87) PCT Pub. No.: WO2020/048673
PCT Pub. Date: Mar. 12, 2020

(65) Prior Publication Data
US 2021/0317665 A1    Oct. 14, 2021

(30) Foreign Application Priority Data
Sep. 3, 2018   (DE) .................... 10 2018 006 951.7

(51) Int. Cl.
*G01M 3/00*    (2006.01)
*E04D 13/00*   (2006.01)
(Continued)

(52) U.S. Cl.
CPC ............ *E04D 13/006* (2013.01); *E04B 1/665* (2013.01); *E04D 5/10* (2013.01); *E04D 12/002* (2013.01); *G01M 3/16* (2013.01); *G08B 21/20* (2013.01)

(58) Field of Classification Search
CPC ....... E04D 13/006; E04D 5/10; E04D 12/002; E04B 1/665; G01M 3/16; G08B 21/20
(Continued)

(56) References Cited

U.S. PATENT DOCUMENTS 4,235,221 A * 11/1980 Murphy .................... F03G 6/00
                                               126/609
4,287,248 A *  9/1981 Gessner ................... B32B 7/12
                                               428/458
(Continued)

FOREIGN PATENT DOCUMENTS

AT           519544 A4    8/2018
DE         19959804 A1    3/2001
(Continued)

OTHER PUBLICATIONS

Deutsche Norm (German Standard) "Thermal Protection and Energy Economy in Buildings—Part 3: Protection Against Moisture Subject to Climate Control Conditions—Requirements and Directions for Design and Construction" DIN 4108-3; Nov. 2014.
(Continued)

*Primary Examiner* — Max H Noori
(74) *Attorney, Agent, or Firm* — Jason H. Vick; Sheridan Ross, PC

(57) ABSTRACT

The invention relates to a construction foil (16), especially roof film, roofing foil, flat roof sheeting, fa-cade sheeting and/or vapor barrier and/or sub-roofing sheeting, especially underlayment and/or sarking sheeting, with a single- or multilayer layer structure (17). It is provided according to the invention that at least one moisture sensor (1) for detecting moisture is associated to the construction foil (16), that the moisture sensor (1) is designed as an active pick-up, and that the moisture sensor (1) comprises at least one electrode (18) and/or a humidity sensing element, and the electrode (18) and/or the humidity sensing element is in direct contact with a nonwoven layer (19).

20 Claims, 10 Drawing Sheets

Figure 1:
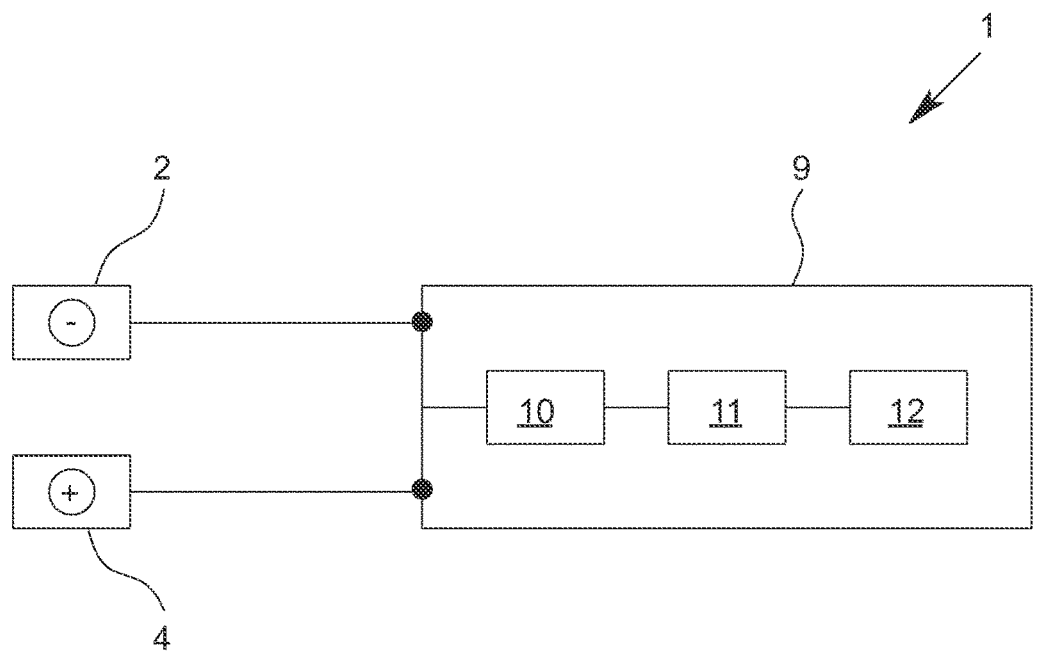

(51) Int. Cl.
*E04B 1/66* (2006.01)
*E04D 5/10* (2006.01)
*E04D 12/00* (2006.01)
*G01M 3/16* (2006.01)
*G08B 21/20* (2006.01)

(58) Field of Classification Search
USPC .......................................................... 73/73
See application file for complete search history.

(56) References Cited

U.S. PATENT DOCUMENTS

| | | | | |
|---|---|---|---|---|
| 5,402,075 | A | * | 3/1995 | Lu ............................ G01R 1/07 |
| | | | | 340/602 |
| 5,818,340 | A | * | 10/1998 | Yankielun ............. E04D 13/006 |
| | | | | 324/696 |
| 8,771,827 | B2 | | 7/2014 | Schröer |
| 2010/0225341 | A1 | * | 9/2010 | Burrows ............... E04D 13/006 |
| | | | | 324/718 |
| 2012/0119915 | A1 | * | 5/2012 | Clement .............. H01Q 1/2225 |
| | | | | 73/40 |
| 2015/0259923 | A1 | * | 9/2015 | Sleeman ............... E04D 13/006 |
| | | | | 52/173.1 |

FOREIGN PATENT DOCUMENTS

| | | |
|---|---|---|
| EP | 0708712 B1 | 12/1999 |
| EP | 2193022 B1 | 12/2013 |

OTHER PUBLICATIONS

International Preliminary Report on Patentability for International Application No. PCT/EP2019/069782, dated Mar. 18, 2021.
International Search Report for International Application No. PCT/EP2019/069782, dated Oct. 23, 2019.
Written Opinion for International Application No. PCT/EP2019/069782, dated Oct. 23, 2019.

* cited by examiner

CONSTRUCTION FOIL

CROSS-REFERENCE TO RELATED APPLICATIONS

This application is a national stage application under 35 U.S.C. 371 of PCT Application No. PCT/EP2019/069782 having an international filing date of 23 Jul. 2019, which designated the United States, which PCT application claimed the benefit of German Application No. 10 2018 006 951.7, filed 3 Sep. 2018, each of which are incorporated herein by reference in their entirety.

The invention relates to a construction foil, especially a roofing film, roofing foil, flat roofing sheeting, facade sheeting and/or vapor barrier and/or sub-roofing sheeting, especially a sarking and/or underlayment sheeting, with a single- or multilayer layer structure.

The construction foil can be used in the installed state as part of a building envelope and/or in the construction industry and/or construction technology. Furthermore, the construction foil can be used underneath, facing away from the weather side, a greening and/or plant substrate and/or fillings, especially gravel fillings, and/or as a vapor barrier, especially facing the interior of a building, and/or as a facade cladding.

The main task of construction foils of the aforementioned type is usually to ensure water-tightness and windproofness under hard roofing and/or facade cladding. This requires a waterproof and windproof construction foil and/or under-roofing, which is manufactured from a plurality of strips of the construction foil and/or under-roofing. For producing, the construction foil is fixed in strips on the roof and/or along a facade, especially in the manner of a component of a building envelope. The individual rows of construction foil strips are connected or welded together, in particular by means of an adhesive connection. By connecting the individual construction foil strips, an attempt is made to ensure the necessary tightness.

Leakage can occur due to installation errors, but also in the event of damage to the under-roofing. In this context, it is problematic that the building envelope and/or facade cladding and/or under-roofing and/or the individual interconnected construction foil strips are not readily visible when installed, since they are usually located between the outer cladding and a further layer, especially an insulation board and/or gravel fill layer and/or interior cladding panels, especially ceiling, wall and/or floor cladding.

If moisture penetrates through the building envelope and/or construction foil, especially in the case of a leak, the period of time until the damage is detected is usually very long. An available increased humidity can therefore cause damage unnoticed, which is usually noticed when the damage becomes visible, especially in the interior of the building. Damage caused by increased humidity can, for example, be a water stain on a wall in the interior of a building. Such a water stain then gives rise to repair, wherein often far more areas are damaged than just the wall comprising the water stain. To repair the damage, the building envelope must be exposed, at least in some areas, in order to find the leak. This is usually associated with very high effort and therefore also with very high costs.

In principle, it is known to provide monitoring systems with passive moisture sensors for the roofing. These moisture sensors are usually enclosed in an insulation board. A passive sensor is a sensor to which electrical energy must be fed from the outside to detect a physical quantity. For this purpose, the passive humidity sensor is connected to a power supply device. If a large number of moisture sensors are used in the roofing, they can be wired together.

Such a monitoring of the building envelope is very cost-intensive, both in terms of the costs for the installation of the monitoring system and due to the running operating costs, especially the energy costs. The running costs consist of the required permanent energy supply on the one hand and the maintenance on the other hand. In addition, no sufficiently precise localization of the leak in the construction foil and/or building envelope can be achieved via the known monitoring system. Thus, even the detection of increased moisture in the roofing requires a time-consuming search for the leak.

Considering the cost-benefit ratio, monitoring of the moisture in the building envelope is usually avoided in practice. In the end, a too late detection of a water damage is accepted in consideration of the costs for a constant monitoring of the moisture.

The object of the present invention is to avoid the above-mentioned disadvantages in the prior art or at least to reduce them substantially.

According to the invention, the aforementioned object is solved in a construction foil of the aforementioned type in that at least one moisture sensor for detecting moisture is associated to the construction foil. According to the invention, the moisture sensor is designed as an active pick-up. According to the invention, it is further provided that the moisture sensor comprises at least one electrode and/or one humidity sensing element, and the electrode and/or the humidity sensing element is in direct contact with a nonwoven layer.

Finally, it is understood that if the moisture sensor comprises an electrode in direct contact with the nonwoven layer, a counter electrode may be provided. The counter-electrode may, but need not, be in direct contact with the nonwoven layer. The counter-electrode may also be arranged in another area of the building envelope and/or spatially remote from the electrode, in particular wherein the counter-electrode is formed by the environment.

Preferably, it is provided that the moisture sensor comprises at least two electrodes which are in direct contact with a nonwoven layer.

Especially the humidity sensing element is designed to detect humidity. For example, a capacitive humidity sensing element can be provided.

By directly assigning the moisture sensor to the construction foil, it is first of all possible to detect the leakage point in the building envelope in a simple manner. Therefore, only a small part of the building envelope has to be removed to reach the leakage point.

In addition, an active pick-up provides the electrical power supply for itself. An active pick-up generate an electrical signal, for example an electrodynamic or piezo-electric signal, due to the measuring principle. According to the invention, an electrochemically generated signal can also be provided. Preferably, therefore, no auxiliary electrical energy and/or no energy transmitted by an external signal is required.

The use of an active pick-up according to the invention also eliminates the need for costly wiring of the sensors to each other and/or to an external power supply. As active pick-ups, the sensors also do not require a constant feed of electrical energy, since—in the case of moisture detection—they can provide the energy required to emit a signal themselves.

A nonwoven layer and/or a layer formed as a nonwoven is especially a structure made of fibers of limited length, continuous fibers (filaments) and/or chopped yarns of any kind and any origin, which have been joined together and connected to form a nonwoven. A nonwoven fabric is usually understood to be a largely flexible textile sheet that is easily bendable.

An arrangement of the electrode of the moisture sensor, preferably of two electrodes, in direct contact with the nonwoven layer enables early and targeted identification and/or localization of that area which comprises increased moisture. An arrangement in the nonwoven layer is not least suitable because the moisture, especially a liquid, can spread in the nonwoven layer and thus wet the electrode surface with moisture and/or a moisture film. Thus, even a leak that is spatially distant from the moisture sensor can be detected via the moisture sensor, since the moisture can spread and/or distribute in the nonwoven layer. Furthermore, the nonwoven layer is advantageously provided on the outside of the construction foil, so that the moisture sensor can especially be manufactured on the outside of the construction foil after producing the layer structure of the construction foil.

The electrode is designed in such a way that it can detect moisture, especially by a change in electrical conductivity and/or resistance. It is understood that the moisture sensor according to the invention can also comprise two electrodes. Preferably, electrochemical electrodes are provided and/or the electrodes are designed as an electrochemical battery and/or metal electrode, in particular wherein the moisture is effective as an electrolyte solution upon contact with the electrode and/or the surface of the electrode.

As electrolyte solution can be understood a liquid material, which contains movable ions and/or charge carriers. The moisture acting as an electrolyte solution can contribute to the generation of an electrical voltage when the electrode and/or the electrodes are contacted.

In a particularly preferred embodiment, it is provided that the electrode and/or the electrodes and/or the humidity sensing element are arranged on and/or in the nonwoven layer. Such an arrangement of the electrode and/or the electrodes and/or the humidity sensing element allows direct contact with the nonwoven layer. If the electrode and/or the electrodes and/or the humidity sensing element are arranged in the nonwoven layer, it is possible to integrate the moisture sensor and/or the humidity sensing element and/or the electrode and/or the electrodes of the moisture sensor during the producing of the construction foil. Especially before connection of the nonwoven layer with the further layers of the construction foil, the electrode or the electrodes and/or the humidity sensing element of the moisture sensor and/or the humidity sensors can already have been connected and/or embedded in the nonwoven layer.

Preferably, the layer structure and/or the construction foil comprises at least one functional layer and at least one support layer. The functional layer can be designed in such a way that the essential functions of the construction foil, especially waterproofing, can be ensured. The support layer can be provided for arranging the functional layer and/or further layers. In addition, the support layer can protect the functional layer and/or the further layers from mechanical stress and/or solar radiation. Ultimately, it is understood that several functional layers and/or several support layers can also be provided in the layer structure.

In a further preferred embodiment of the invention, it is provided that the functional layer is open to diffusion, especially permeable to water vapor, and/or waterproof and/or breathable. More preferably, the functional layer is open to diffusion, waterproof and breathable.

A diffusion-open functional layer can be achieved by designing it as a microporous membrane. In a microporous membrane, protection against water and/or moisture is maintained because water droplets are too large and, due to their surface tension, do not pass through the micropores—which are provided for diffusion transport. A microporous membrane can be manufactured from a diffusion-tight polypropylene film and/or plastic film. During production and/or manufacture of the film, a filler, especially calcium carbonate, can be added for pore formation, wherein the film is afterwards stretched and/or stretched. However, the microporosity of the membrane can also be achieved by other methods.

Especially preferably, the construction foil and/or the multilayer layer structure, which is especially designed as a roofing foil and/or sub-roofing foil, is waterproof, open to diffusion and/or breathable. In addition, the construction foil can also be designed to be windproof, wherein the laid, interconnected rows of the construction foil design an under-roofing.

Alternatively or additionally, it can be provided that the construction foil, which is preferably designed as a flat roofing sheeting, is designed to be water-barrier and/or water-tight, diffusion-tight, water vapor-impermeable, vapor seal and/or vapor-barrier. Especially the construction foil is designed in such a way that above the construction foil, facing the weather side, a drainage and/or a water drainage function is ensured, so that water accumulating on the flat roof can be avoided.

Preferably, the construction foil, especially formed as a flat roof sheeting, comprises an Sd value of greater than or equal to 2 m, preferably of greater than 50 m, more preferably of 50 to 2500 m, wherein the aforementioned Sd value is realized at least in the non-overlapped area of building foil strips. The Sd value describes the air layer thickness equivalent to water vapor diffusion and is a measure of the resistance of a component layer to the passage of water vapor. According to DIN 4108-3 (as of July 2018), an Sd value of greater than or equal to 0.5 m ensures a diffusion-inhibiting and/or vapor barrier layer, especially wherein an Sd value of greater than or equal to 1500 m ensures a diffusion-tight and/or vapor barrier layer.

Furthermore, the construction foil designed as a facade sheet can be wind-braking, waterproof, UV-resistant and/or open to diffusion, in particular wherein the construction foil can also be designed as an insulating sheet.

Preferably, the construction foil designed as a flat roofing sheeting is designed as a bituminous membrane, in particular a self-adhesive bituminous membrane, and/or a roof sealing sheeting.

Furthermore, the construction foil can be designed as a vapor seal and/or vapor barrier, in particular wherein the construction foil is designed to be diffusion-tight, diffusion-inhibiting, water vapor-sealing, water vapor-blocking and/or air-tight, preferably waterproof.

In particular, the functional layer and/or the construction foil, in particular in the form of a sub-roofing membrane, comprises an Sd value of less than or equal to 0.5 m, preferably from 0.01 to 0.5 m, even more preferably from 0.01 to 0.1 m, in particular wherein the aforementioned Sd value is realized at least in the non-overlapping region of construction foil strips. With an Sd value of less than or equal to 0.5 m, a diffusion-open layer is guaranteed according to DIN 4108-3 (as of July 2018).

Furthermore, in an even more preferably embodiment, the nonwoven layer is designed as a thermally reinforced and/or needle-jet and/or wet-jet reinforced nonwoven layer. In particular wherein a plurality of distributors providing the water jets and spaced apart from each other can be provided, irradiation with water jets or needling can be provided for bonding the nonwoven layer. Both needling and hydroentanglement are among the mechanical bonding methods used in nonwoven production.

Alternatively or additionally, a polyolefinic nonwoven, a polyester nonwoven, a natural fiber nonwoven, a polypropylene spunbonded nonwoven, a polyamide nonwoven, a polylactide nonwoven (PLA nonwoven), and/or a staple fiber nonwoven and/or a close-meshed knitted fabric may be provided as the nonwoven layer.

Most preferably, the support layer is designed as a nonwoven layer. Ultimately, it is understood that the support layer can also comprise at least one of the aforementioned forms of nonwoven layer.

Preferably, the moisture sensor, especially comprising at least one electrode and/or two electrodes, is in direct contact with the support layer. Preferably, the moisture sensor can be arranged on and/or in the carrier layer. It is advantageous here that the moisture can spread over the support layer, since the support layer, which is preferably in the form of a nonwoven layer, can store and/or distribute moisture, especially water. In this way, even a moisture penetration point in the under-roofing that is spatially remote from the moisture sensor can be reliably detected and/or subsequently remedied.

In general, the moisture sensor—in the installed state of the construction foil—can be arranged either on the top side, facing the weather side, or on the underside, facing away from the weather side, of the construction foil. The top side or bottom side arrangement of the moisture sensor is especially dependent on the type of use of the construction foil according to the invention, as will be explained in detail below.

Preferably, the support layer comprising the moisture sensor and/or the nonwoven layer comprising the moisture sensor and/or the electrode is arranged on the underside of the construction foil, facing away from the weather side. However, it is also possible to arrange the support layer comprising the moisture sensor and/or the nonwoven layer comprising the electrode on the top side of the construction foil, facing the weather side.

Alternatively or additionally, it can be provided that at least one further layer of the layer structure is arranged on the top side, facing the weather side, of the carrier layer comprising the moisture sensor and/or the nonwoven layer comprising the moisture sensor and/or the electrode. Especially the support layer and/or nonwoven layer comprising the moisture sensor and/or the electrode does not directly face the weather side.

The weather side is understood to be that top side of the construction foil which is at least indirectly exposed to external weathering influences. It is advantageous here that the functional layer is usually protected by a support layer and/or nonwoven layer facing the weather side, so that the functional layer is protected from mechanical stresses.

Alternatively or additionally, the moisture sensor and/or the electrode and/or the electrodes can also be arranged on the nonwoven layer facing the weather side and/or an insulation, i.e. on the outside of the construction foil on the outside nonwoven layer.

In practice, however, the support layer and/or the nonwoven layer are usually not designed to be waterproof. If the moisture sensor is thus arranged on the nonwoven layer and/or support layer directly facing the weather side, moisture is especially detected even if the moisture does not penetrate through the functional layer and/or the further layers of the multilayer layer structure. In this context, it is advantageous that the moisture sensor and/or the electrode is arranged in the area of the layer structure facing the interior of the building and/or the insulation.

A different behavior may result in the case of a construction foil designed as a vapor sealing. In this context, advantageously, the moisture sensor and/or the electrode and/or the electrodes may be arranged on the outer side of the construction foil facing away from the interior of the building, especially on and/or in the nonwoven layer.

Consequently, the moisture sensor is preferably arranged in those layers of the construction foil which, in the installed state, are already protected, preferably by the functional layer, from moisture available on the weather side, especially water and/or rain.

In a further preferred embodiment, it is provided that the nonwoven layer and/or the support layer, preferably in the form of a nonwoven layer, comprises an electrolyte former which is soluble in water and/or miscible with water.

An electrolyte former is a chemical connection which, in the liquid or dissolved state, is dissociated into ions which move in a directed manner under the influence of an electric field.

Especially citric acid powder and/or a powder comprising oxaloacetic acid, mulonic acid, glutaric acid, quinic acid and/or a vitamin C can thereby be provided as electrolyte former. Ultimately, the electrolyte former is provided in the nonwoven layer and/or the support layer in such a way that, on contact with moisture, the electrolyte former detaches in the moisture and thus preferably increases the electrical conductivity and/or the number of free charge carriers in the moisture formed as the electrolyte solution. It is advantageous here that, insofar as the moisture sensor detects the moisture on the basis of an electrochemical measuring principle, the electrical energy and/or electrical voltage generated on the basis of the measuring principle can be increased. Especially in this way, even very small amounts of moisture can be detected in a target- and purpose-oriented manner.

It is particularly preferably provided that the moisture sensor comprises sensor electronics, wherein the sensor electronics comprise a transmitting device which is designed for the wireless transmission of information. The transmitting device can especially be used to exchange information with a receiving device, which is especially provided externally. In addition, the transmitting device can also be used for alarming and/or informing an outside observer with regard to incoming moisture, so that the presence of the moisture detected by the moisture sensor is also communicated to outside observers in good time. Finally, the transmitting device serves to transmit the measurement data recorded by the moisture sensor.

Furthermore, the present invention relates to a system with a construction foil or a sub-covering comprising a plurality of strips of a construction foil according to one of the aforementioned embodiments and a transmitting device, wherein information from the transmitting device can be transmitted to the receiving device without contact, preferably whereby the receiving device is designed in such a way that the moisture sensor can be located and/or identified.

Ultimately, it is understood that preferred embodiments of the construction foil can likewise be applied to the system according to the invention. In order to avoid unnecessary repetition, reference is made to the previous explanations with regard to advantages and preferred embodiments.

The system according to the invention enables moisture sensors integrated in the construction foil and/or under-roofing to be localized when moisture is detected, so that the leak through which the moisture enters the building envelope can be determined in a targeted and purposeful manner and consequently also remedied in good time—without causing major consequential damage.

Especially in the case of large areas that comprise a part of a building envelope and/or a building envelope formed by rows of the construction foil, communication between the transmitting device of the moisture sensor and a receiving device, especially an external one, makes it possible, on the one hand, to exchange the information in good time and, on the other hand, to reduce the costs of repairing a leak in the under-roofing.

The moisture sensor can be located via GSM (international standard for digital radio networks), GPS (Global Positioning System), NFC (Near Field Communication) and/or localization of a transmitter ID emitted by the moisture sensor and/or identification information emitted by the moisture sensor.

Preferably, the moisture sensor comprises at least two electrodes for detecting moisture, wherein a first electrode comprises a first material at least in some areas and a second electrode comprises a second material at least in some areas and wherein the second material differs from the first material so that an electrical voltage is generated when the first material and the second material come into contact with moisture.

Advantageously, the first electrode forms an anode and the second electrode forms a cathode when the first material and the second material come into contact with moisture. A voltage is generated between the anode and the cathode, which can be used especially for signal and/or alarm generation and/or for information transfer and/or for power supply. Due to the voltage, which only arises upon contact with moisture, it is possible to provide a moisture sensor, which especially exclusively detects and possibly emits a corresponding signal when moisture comes into contact with the surface of the first electrode comprising the first material and the surface of the second electrode comprising the second material. Thus, it is possible to provide an active sensor whose energy supply is ensured by itself—namely by the measuring principle—and which does not require an external power supply. Such sensors are referred to as active pick-ups.

The moisture to be detected can form a film of moisture at least in part on the surface, especially on the surface areas comprising the first and the second material, and/or the moisture to be detected is the film of moisture.

Especially, the moisture may be a liquid connecting the electrodes directly and/or indirectly to each other. Ultimately, the moisture may also directly and/or indirectly bind the electrodes together.

A direct connection of the electrodes via the moisture is understood to be a continuous, especially uninterrupted, moisture film and/or a continuous liquid that connects the electrodes directly and/or immediately to each other. The moisture film and/or the liquid may ultimately extend at least in regions along the free space available between the electrodes and/or be provided between the electrodes. Consequently, the electrodes are electrically connected upon and/or after the occurrence of a voltage across the moisture.

In contrast, it is understood as indirect connection that the moisture and/or moisture film contacting the first material does not directly contact the second material, wherein the second material is also contacted by a moisture and/or moisture film, in particular wherein no moisture film extending at least regionally along the free space between the electrodes is available. However, the moisture contacting the first material and the second material are electrically conductively connected to each other, especially such that the first electrode can be electrically conductively connected to the second electrode upon contact of the first material and the second material with moisture.

Especially a water-based moisture is provided as the moisture to be detected. Ultimately, it is understood that a liquid can also be detected by means of the moisture sensor. Especially water is provided as liquid.

It is especially preferred that a plurality of moisture sensors is used, especially in the roof area and/or in a building envelope, preferably arranged on flat roof sheets, vapor barriers, facade sheets and/or sub-roof sheets, wherein the moisture sensors are not wired to each other. Each sensor can supply itself autonomously with energy; and only in the case when moisture is also detected. As long as no moisture is available, the moisture sensor is in "sleep mode", so to speak.

The moisture acts as an electrolyte solution and/or forms an electrolyte solution on contact with the first material and the second material. An electrolyte solution can be understood as a liquid material containing mobile ions and/or charge carriers. The moisture acting as electrolyte solution can—as mentioned before—electrically connect the electrodes directly and/or indirectly in such a way that a voltage can be generated between the electrodes. The resulting voltage can then be used further.

Furthermore, the moisture sensor according to the invention provides a very economical method for detecting moisture, especially in the roof area, since maintenance costs and ongoing operating costs are eliminated. In addition, the installation of the moisture sensor according to the invention is very simple and only associated with low costs, since wiring of the moisture sensor and/or a connection of the moisture sensor to an external energy supply device and/or to the further moisture sensors can be omitted according to the invention.

According to the invention, it is provided that the first electrode can comprise the first material and/or comprise the first material at least in areas on the surface. An area-wise surface comprising is to be understood in the way that the material is provided at least in a surface area, so that a reaction, especially an electrochemical reaction, is caused upon contact with the moisture. Ultimately, therefore, the first material is arranged in a reaction region which is surface provided on the electrode. In addition, several further materials may also be available in the respective electrode, which especially cause and/or contribute to a higher voltage or which have at least essentially no influence on the voltage arising between the electrodes.

In a particularly preferred embodiment, the two electrodes form a galvanic element and/or are designed as part of a galvanic element Especially the two electrodes form a Volta cell and/or a Volta unit A galvanic element is understood to be an energy conversion device that converts chemical energy into electrical energy.

Thus, a combination of two different electrodes and an electrolyte solution can form a galvanic element. The galvanic element can serve as a DC voltage source. The characteristic value is the impressed voltage. In a galvanic element, the electrodes are electrically connected to each other via the moisture contacting the first and/or the second material. In a galvanic element, it is provided that the two electrodes are directly connected to each other via the same moisture, preferably formed as an electrolyte solution, in particular wherein the moisture bridges and/or at least regionally fills the free space resulting between the electrodes. An electrical voltage is generated between the electrodes electrically connected via the moisture, which can be supplied directly or indirectly to an electrical consumer if necessary.

The moisture sensor according to the invention does not form a galvanic element until the electrodes, especially the first material and the second material, come into contact with moisture, preferably in the form of an electrolyte solution. Preferably, the electrolyte solution contacts the first material of the first electrode and the second material of the second electrode, at least in certain areas, so that a voltage can be generated between the electrodes. If the galvanic element is formed by the moisture sensor, the resulting voltage can be used for signal and/or alarm generation.

The function of the galvanic cell is based on a redox reaction. Reduction and oxidation take place spatially separated in and/or at the first and the second electrode.

In the invention, the electrodes are typically electrically connected to each other via moisture. Preferably, separate moistures can be electrically conductive connected to each other by connecting the two half cells—i.e. the electrode contacted with the moisture—with an electron conductor and/or an ion conductor so that the circuit is closed. A half-cell can be understood as an electrode in contact with moisture formed as an electrolyte solution.

The resulting voltage depends especially on the type of the first and the second material, the concentration in the solution of the respective half-cell, the ions, the pH value as well as the temperature. When discharging galvanic cells, the negative pole is the anode and the positive pole is the cathode. Reduction takes place at the cathode, wherein oxidation takes place at the anode.

The galvanic cell ultimately provides a voltage until electro-chemical equilibrium has been reached. Especially a voltage is generated whenever two different metals are present in a moisture, preferably in the form of an electrolyte solution. This is especially due to the respective tendency of the metals to go into solution and thereby form ions, the so-called solution tendency. In addition to the Daniell element, i.e. electrodes comprising copper and zinc, a galvanic element can thus also be produced from copper and silver electrodes, for example.

The electrolyte solution can be formed by an electrolyte former at least partially dissolved in the moisture. Preferably, the moisture sensor comprises the electrolyte former and/or the electrolyte former is associated to the moisture sensor, in particular wherein the electrolyte former is arranged in the immediate vicinity to the electrodes and/or the moisture sensor. An electrolyte former is understood to be a chemical connection which, in the liquid or dissolved state, is dissociated into ions which move in a directed manner under the influence of an electric field.

Especially it can be provided that the electrolyte former increases the acid content of the moisture contacting the first and/or the second material.

Preferably, a coating is provided at least in some areas on the surface of the first electrode and/or the second electrode. Especially the coating is provided on the first surface area comprising the first material and/or on the second surface area comprising the second material.

The coating can protect the electrode at least in some areas, in particular from corrosion and/or mechanical stress. Accordingly, the coating can be designed as corrosion protection.

In addition and/or alternatively to the corrosion protection, it is also conceivable that the coating contributes to the formation of an improved electrolyte solution when the first material and the second material come into contact with moisture, preferably by increasing the acid content and/or the concentration of the dissociated free charge carriers of the moisture. Thus, it may be provided that the coating comprises citric acid powder and/or a powder comprising oxaloacetic acid, mulonic acid, glutaric acid, quinic acid and/or vitamin C, which detachment occurs upon contact with moisture, especially in the liquid.

The coating can further be miscible with water and/or soluble in water. This is especially suitable if the coating is also arranged above the first material and/or the second material, so that when the coating comes into contact with moisture, the first material and the second material can also be contacted with moisture.

Ultimately, various options can be provided by the coating, which can especially also be combined with one another.

In a particularly preferred embodiment, it is provided that the first material and the second material comprise a metal. Preferably, two different metals are provided which generate an electrical voltage when in contact with moisture.

The metals are especially selected from the electrochemical voltage series, which is a listing of redox pairs according to their standard potential. For metals, the electrochemical voltage series is also called the redox series. From the electrochemical voltage series, it is possible to derive the redox behavior, which especially contributes to the occurrence of the electrical voltage. Each redox reaction can thus be described by two pairs and the direction of the reaction can be predicted from the electrochemical voltage series. The redox potential, in turn, is a measure of the readiness of the ions to pick up the electrons. The ions of noble metals pick up electrons more readily than the ions of base metals.

The voltage developed between two electrically connected electrodes, each comprising two different metals, is especially equal to the difference in the standard electrode potentials associated with the redox pairs in the electrode spaces and tabulated in the electrochemical voltage series. Especially, the resulting voltage of a galvanic cell and/or a galvanic element can be determined in this way.

Preferably, the first material comprises a standard negative potential. In particular, the first electrode can be designed as an anode, wherein the anode forms the negative pole when the galvanic cell is discharged.

In addition, the second material may comprise a positive standard potential. The second material may in turn be designed as a cathode, wherein the cathode forms the positive pole when the galvanic cell is discharged.

It is more preferably that the first material comprises a base metal. In this context, it is especially suitable that the second material comprises a noble metal.

Preferably, the difference of the standard electrode potentials is between 0.01 to 6 V, preferably between 0.2 to 4 V, further preferably between 1 to 3 V.

Furthermore, the first material may comprise zinc and/or nickel. Especially, the second material comprises platinum, silver, gold, copper and/or tin. More preferably, the material combination of the first material and the second material is zinc and gold. Other advantageous material combinations for the first electrode and the second electrode with respect to the voltage generated in the presence of moisture include zinc and platinum, zinc and silver, zinc and copper, zinc and nickel, and/or platinum and nickel. In a material combination of zinc and nickel, it is provided that the first material and the second material comprise a standard negative potential and a base metal. The advantageous material composition results especially from the ability of the materials to form a galvanic cell upon contact with moisture.

Most preferably, zinc is provided as the first material, since zinc and/or zinc ions, go and/or transfer very well into the moisture formed as a solution.

Preferably, it is provided that that surface area of the first electrode and/or the second electrode which comprises the first material and/or the second material comprises an area of from 1 mm$^2$ to 100 cm$^2$, preferably from 100 mm$^2$ to 50 cm$^2$, even more preferably from 0.1 cm$^2$ to 10 cm$^2$. Especially, the first material and/or the second material is present on the aforementioned surfaces at least substantially equally distributed.

The electrodes may be designed as cuboids and/or rods. Furthermore, the electrodes may have been applied as a, preferably thin, metal layer on a flexible printed circuit board and/or a flexible element, in particular wherein the electrode formed as a metal layer comprises a layer thickness between 10 nm to 800 µm, preferably from 100 nm to 100 µm.

The distance between the electrodes and/or the width of the free space resulting between the electrodes can range from 0.01 mm to 20 cm, preferably from 0.1 mm to 10 cm, even more preferably from 1 mm to 5 cm. Ultimately, the spacing, and thus the response speed, depends on the particular application.

In another particularly preferred embodiment, it is provided that the moisture sensor comprises sensor electronics which, for operation, can be supplied with electrical energy by the electrical voltage generated between the first electrode and the second electrode, preferably exclusively. The aforementioned electrical voltage is ultimately generated when moisture is detected, whereby the sensor electronics can be supplied with electrical energy especially only when moisture is detected.

Consequently, the moisture sensor is especially designed as an active sensor that generates electrical energy itself. The generated electrical energy can be used more preferably to supply the sensor electronics, in particular wherein the generated electrical energy is provided as the sole source of electrical energy in the moisture sensor. The electrical energy is ultimately derived from the chemical energy and thus from the sensor environment. This energy conversion may also be referred to as energy harvesting.

Furthermore, the sensor electronics may comprise an energy storage device. Through the energy storage device, the moisture sensor may be arranged to store, preferably accumulate, electrical energy originating from the electrodes. Accumulation of the electrical energy offers the advantage that a sufficiently large electrical energy for operating the sensor electronics can be obtained even with a low electrical voltage that is generated.

Especially a capacitor is provided as energy storage device. The capacitor may comprise two electrically conductive surfaces, the electrodes of the capacitor, which are separated from each other by an insulating material, the dielectric. However, the energy storage device may also be formed by an electrolytic capacitor and/or an accumulator and/or a supercapacitor.

The energy storage device can be designed to statically store electrical charge and the associated electrical energy in a DC circuit.

Especially, the energy storage device can be charged by the (DC) voltage generated between the electrodes upon contact with moisture. After this DC voltage is applied, a monotonic electric current can flow, charging the electrodes of the capacitor in opposite poles so that a steadily increasing voltage is established in the capacitor.

The electric potential that builds up on the electrodes of the energy storage device causes an electric field to develop in the space between the electrodes of the energy storage device, the field strength of which is proportional to the applied electric voltage.

Preferably, the sensor electronics comprise a voltage increasing device, especially a boost regulator. The voltage boosting device can be electrically connected to the energy storage device and/or the first and second electrodes so that the electrical voltage is increased. Preferably, the voltage generated between the first electrode and the second electrode and/or the voltage of the energy storage device is provided in an increased manner.

Accordingly, the voltage increasing device may increase the voltage generated directly upon contact with moisture or the voltage, preferably accumulated, of the energy storage device. Finally, the voltage increasing device is designed in such a way that further components of the sensor electronics can be sufficiently supplied with electrical energy.

The voltage increasing device can especially be designed in such a way that the voltage can be raised and/or increased to up to 10 V, preferably between 1 V and 5 V, even more preferably between 2 V to 4 V. The voltage increasing device can ultimately be designed as a boost converter for generating an operating voltage, wherein the operating voltage is higher than the electrode voltage.

Especially a charge pump can be provided as voltage increasing device. The term "charge pump" covers several different electrical circuits which increase the value of electrical voltages or reverse the polarity of DC voltages. According to the invention, an increase in electrical voltage is provided. The advantage of a charge pump is that it does not require magnetic components such as coils or transformers. A charge pump in the form of a DC/DC converter is particularly preferred. Charge pumps can transport electrical charge with the aid of electrical capacitors, wherein a high electrical output voltage can be generated by periodic switching with switches.

Furthermore, the sensor electronics can comprise a transmitting device for wireless transmission of information. Especially the transmitting device can comprise a, preferably active, RFID transponder. The RFID transponder can be designed as an active tag, especially an RFID tag. Alternatively or additionally, it may be provided that the transmitting device comprises a near-field communication (NFC) transmitter and/or a global system for mobile communication (GSM) transmitter.

Preferably, the transmitting device, especially the active RFID transponder, is designed in such a way that no external activation signal, especially from a receiving device and/or an RFID reader, is required to transmit the information. The activation preferably takes place, especially automatically, by supplying electrical energy.

The transmitting device can be supplied and activated at least indirectly by the electrical voltage generated between the electrodes. After activation of the transmitting device, it can transmit the information, especially wirelessly, preferably via radio frequency waves.

RFID is the abbreviation for radio-frequency identification ("identification by means of electromagnetic waves"). RFID refers to a technology for transmitter-receiver systems for the automatic and contactless identification and/or localization of objects and living beings using radio waves. The RFID transponder is especially located at the moisture sensor and may comprise an antenna, an analog circuit, possibly for receiving, for transmitting, a digital circuit and/or a permanent memory. Especially an active RFID transponder is provided, which uses its own energy source both for powering the microchip and for generating a modeled signal.

Ultimately, the transmitting device may be powered directly or indirectly by electrical energy from the voltage generated between the electrodes.

The transmitting device may be powered directly by the voltage developed between the electrodes when the first and second materials contact moisture.

Preferably, the transmitting device is supplied indirectly by the voltage generated between the electrodes when the first and second materials come into contact with moisture. Preferably, the transmitting device can thereby be supplied with electrical energy from the energy storage device.

Alternatively or additionally, the transmitting device can preferably be supplied with the increased electrical voltage of the voltage increasing device for operation. The voltage increasing device can ultimately be designed so that the transmitting device can be sufficiently supplied with the increased electrical voltage for operation.

Especially the transmitting device can be supplied with electrical energy by the voltage increasing device, which is preferably designed as a load pump, and the energy storage device.

Furthermore, the transmitting device can be supplied with electrical energy from the electrodes in combination with the energy storage device and/or the voltage increasing device.

Ultimately, the transmitting device is supplied with electrical energy especially only when the moisture sensor detects moisture. If no moisture is detected, no electrical energy is fed to the transmitting device, so that the transmitting device is "inactive", so to speak. Ultimately, the transmitting device can only be activated if the first material and the second material come into contact with moisture, resulting in an electrical voltage.

Preferably, the transmission of the information by the transmitting device is automatic. Furthermore, a transmission of the information via radio can be provided, wherein in this context the transmitting device is designed as a radio sensor.

The information may comprise location data and/or identification data. Alternatively or additionally, it can also be provided that the transmitting device emits an acoustic or visual signal. This alarm signal and/or warning tone can be used to signal and/or inform about the detected detection of moisture.

In a further embodiment, at least one electrode is enclosed at least regionally in a respective encapsulating means. The encapsulation means can be designed in such a way that the at least one electrode is completely or at least partially surrounded by and/or encapsulated in the encapsulation means. More preferably, both electrodes are enclosed in an encapsulation means.

The wall of the encapsulating means can especially comprise at least one, preferably capillary-shaped, passage. The passage can be designed in such a way that the moisture available on the outer surface of the encapsulation means facing away from the electrode can be guided via the passage to the first material and/or the second material of the first electrode and/or the second electrode. Ultimately, the encapsulation means can be used to guide the moisture specifically to those surface areas of the electrodes that comprise the first material and/or the second material. The encapsulation means can especially protect the electrodes from mechanical stresses.

In a further embodiment, it can be provided that a plurality of electrode pairs, each formed by first and second electrodes, is provided in the moisture sensor. The electrode pairs, each comprising a first electrode and a second electrode, may be connected in series and/or in parallel, preferably to increase the electrical voltage generated when the first material and the second material come into contact with moisture and/or to reduce the internal resistance. The electrode pairs may each be identically designed, wherein they comprise different first and/or second materials.

Furthermore, the moisture sensor can be formed as part of a system, wherein the system further comprises a transmitting device, wherein information from the transmitting device can be transmitted to the receiving device in a non-contact manner. Preferably, the receiving device is thereby arranged to enable the moisture sensor to be located and/or identified.

In this context, it is understood that the system according to the invention can comprise a moisture sensor which is designed according to at least one of the aforementioned preferred embodiments. In this respect, all the advantages and preferred embodiments described earlier also apply to the system according to the invention, so that in order to avoid unnecessary repetition, further explanations with regard to the advantageous design of the moisture sensor— and of the system—are dispensed with at this point.

The system ensures the communication of the transmitting device of the moisture sensor with a receiving device, especially external and/or spatially remote, which does not have to be arranged at the moisture sensor. The transmitting device transmits information to the receiving device. The information may comprise location data and/or identification data.

Further, the system may be designed as a radio frequency (RF) system and/or frequency identification (FID) system, preferably an active RF system and/or FID system, that transmits information via radio and/or radio waves.

For example, the moisture sensor can determine its location, preferably via a global positioning system (GPS) signal, and/or transmit it to the receiving device.

Alternatively or additionally, it is conceivable that the transmitting device comprises an active RFID transponder, so that the system is designed as an active RFID system. The system transmits a signal via the transmitting device when moisture is detected and receives the information via the receiving device.

Preferably, a plurality of moisture sensors is provided in the system.

Preferably, the receiving device can comprise an allocation means for analysis the information received from the transmitting device, preferably so that the moisture sensor can be identified on the basis of the information transmitted from the transmitting device after processing the information by means of the allocation means. Especially the allocation means comprises an assignment table for this purpose.

By means of an identification, a localization can take place so that a user can be informed by the receiving device at which location the moisture sensor is arranged and/or which moisture sensor has detected a moisture condition. This is especially useful when a large number of moisture sensors are used. The moisture sensors are ultimately used to detect moisture in an area to be protected from moisture, for example on a roof. The user can therefore be informed in a targeted and purpose-oriented manner which moisture sensor has detected a moisture condition.

Especially a spatial distance and/or spatial spacing between the transmitting device and the receiving device of more than 1 m, preferably between 1 m and 100 m, even more preferably between 2 m and 30 m, in particular between 5 m to 15 m, can be provided.

A method for detecting moisture with a moisture sensor of the aforementioned type according to the invention may be provided, wherein moisture comes into contact with the first material and the second material, thereby generating an electrical voltage which directly or indirectly supplies the transmitting device with electrical energy for operation, so that the transmitting device transmits information to the receiving device.

In this context, it is understood that preferred embodiments of the moisture sensor and/or the system according to the invention can also be applied to the method according to the invention. In order to avoid unnecessary repetitions, reference is made to the previous explanations with regard to the advantages and the preferred embodiments of the moisture sensor and the system according to the invention.

If the transmitting device is supplied indirectly by the voltage generated between the electrodes, it can be provided that the sensor electronics comprise an energy storage device and/or a voltage increasing device via which the transmitting device can be supplied with electrical energy. If the transmitting device is directly supplied with the electrical voltage, the transmitting device is arranged at the electrodes of the moisture sensor and electrically connected to them. The transmitting device represents a consumer of the sensor electronics, which can be supplied, especially exclusively, by the electrical voltage generated—due to the measuring principle—during the measuring and/or during the detection of moisture.

Furthermore, the present invention relates to the use of the construction foil, the moisture sensor and/or the system for leak detection and/or for the detection of moisture in roof areas, preferably in flat and/or sloping roofs, and/or under a floor covering and/or in wet rooms and/or for checking the tightness of facades.

The orientation of the moisture sensor and/or of the support layer comprising the moisture sensor and/or of the nonwoven layer comprising the electrode preferably depends on the type of use, especially whether the use takes place on a pitched roof or on a flat roof.

If the construction foil is used on a pitched roof, the moisture sensor and/or the support layer comprising the moisture sensor and/or the nonwoven layer comprising the electrode preferably face away from the weather side and/or towards the roof area. Accordingly, the preferably provided at least one functional layer faces the weather side, so that moisture due to leakage can be detected and/or recorded via the moisture sensor associated to it.

If, on the other hand, the construction foil is used on a flat roof, the moisture sensor and/or the support layer comprising the moisture sensor and/or the nonwoven layer comprising the electrode preferably face the weather side and/or face away from the roof area. Accordingly, the preferably provided at least one functional layer faces away from the weathering side and/or faces the roof area. To ensure that the moisture sensor and/or the layer comprising the moisture sensor is not directly exposed to the weather, a separate sealing sheet, preferably a bitumen sheet, is preferably provided to cover the construction foil on the weather side. If a leak occurs in the sealing sheet, this is then correspondingly detected by the moisture sensor.

It is understood that the alignment on the flat roof can be carried out analogously to the alignment on the pitched roof described earlier, especially if the separate sealing sheet is dispensed with. Then, preferably, the functional layer acts as weather protection for the moisture sensor.

In addition, the construction foil can also be used and/or applied for leak detection on insulation elements, for example insulation layers or insulation boards. For this purpose, the construction foil is arranged directly under the insulation element in order to detect moisture that has passed through the insulation element via the moisture sensor.

In this arrangement, the moisture sensor can be arranged both facing the insulating element and/or facing away from the roof area and facing away from the insulating element and/or facing the roof area. If moisture penetration and/or leakage on the construction foil itself is also to be detected, it is preferable to arrange the moisture sensor on and/or on the side of the construction foil facing away from the insulating element and/or facing the roof area. This arrangement is especially advantageous if the construction foil is designed as a vapor sealing and/or vapor barrier.

The use according to the invention is characterized by a long service life of the sensors, an omitted external energy supply of the moisture sensor and a simple method for determining and/or detecting the moisture, which is associated with comparatively low manufacturing and/or operating costs.

Furthermore, the invention relates to the use of a moisture sensor according to one of the embodiments described earlier and/or of a system according to one of the embodiments described earlier for the wireless, especially wireless and/or battery-free and/or energy-autonomous, detection of moisture, especially in a building envelope, preferably in the facade and/or roof area.

Furthermore, it is understood that any intermediate intervals and individual values are included in the aforementioned intervals and range limits and are to be considered disclosed as essential to the invention, even if these intermediate intervals and individual values are not specifically provided.

Further features, advantages and possible applications of the present invention will be apparent from the following description of examples of embodiments based on the drawing and the drawing itself. Thereby, all features described and/or illustrated form the subject matter of the present invention, either individually or in any combination, irrespective of their summary in the claims and their correlation.

Figure 2:
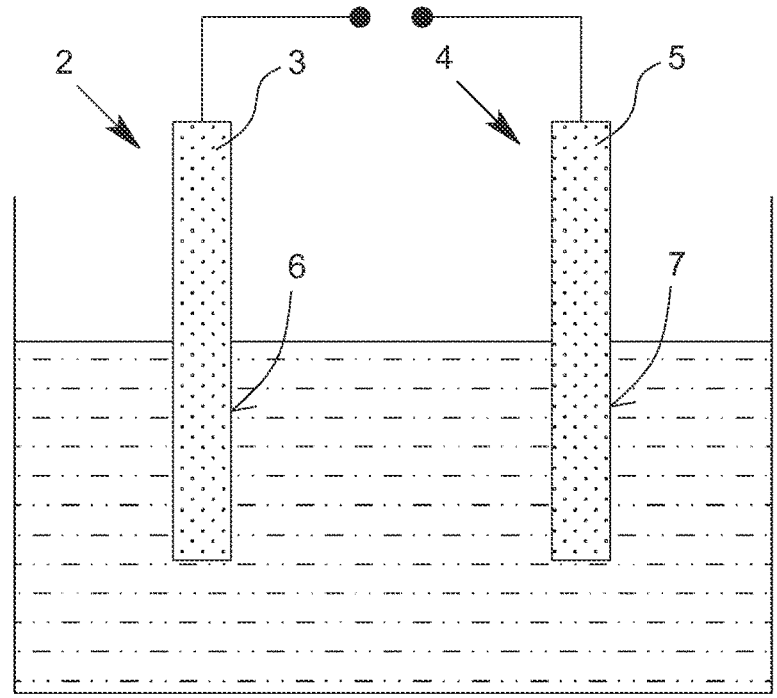
Figure 3:
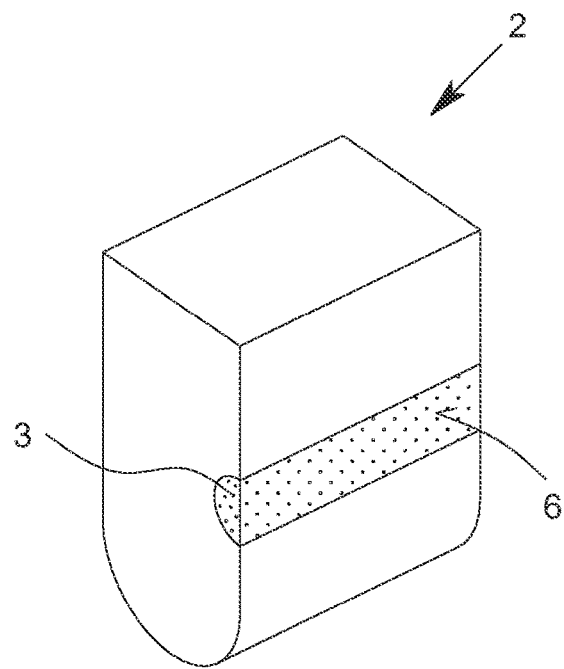
Figure 4:
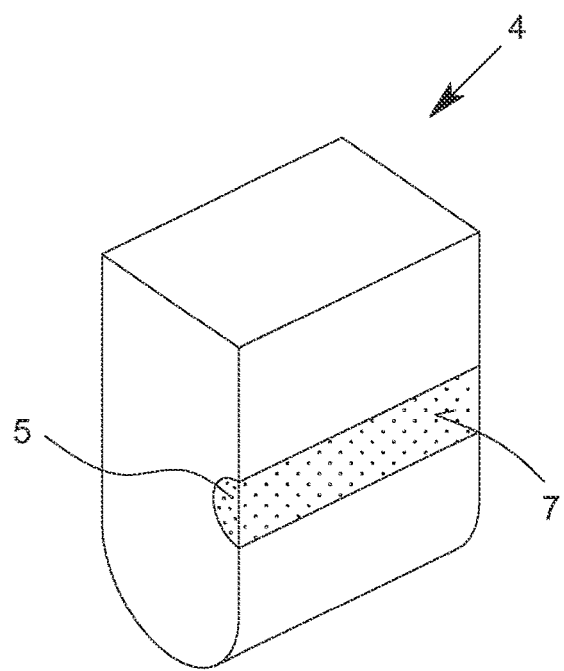
Figure 5:
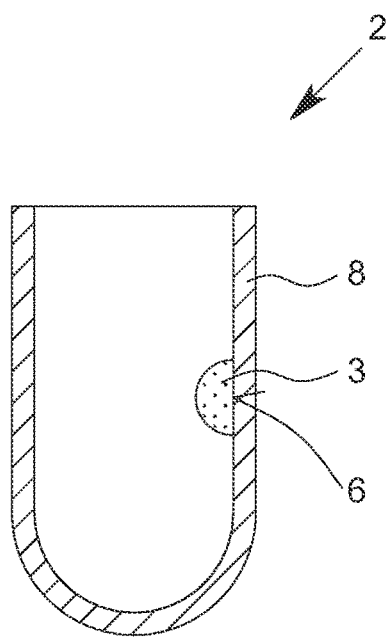
Figure 6:
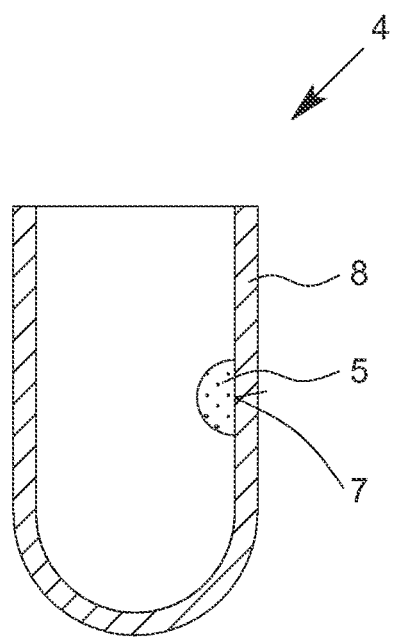
Figure 7:
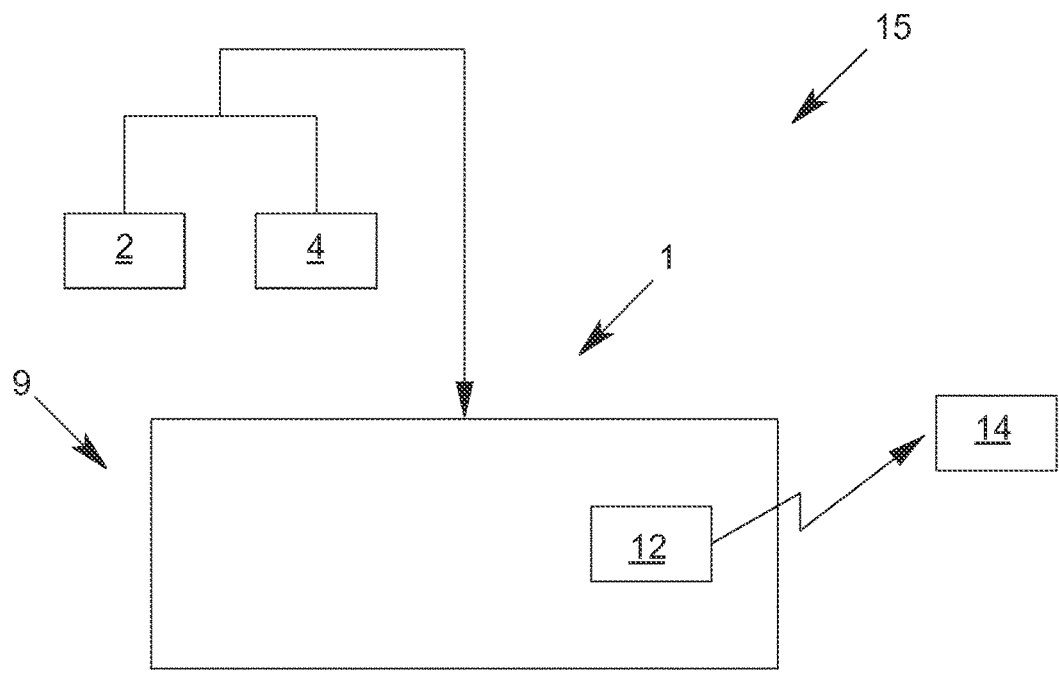
Figure 8:
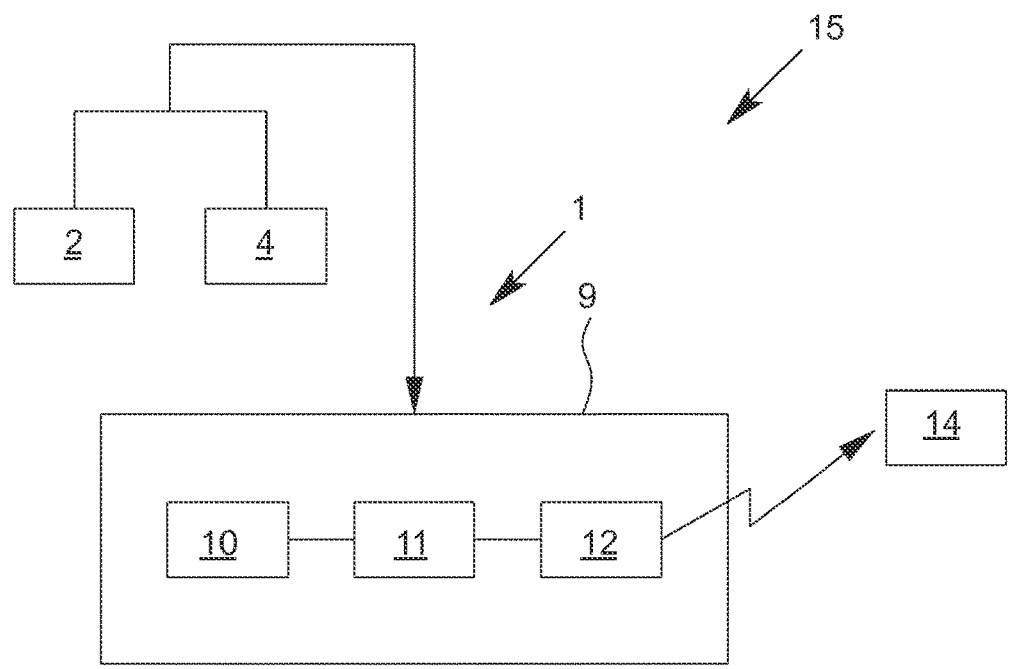
Figure 9:
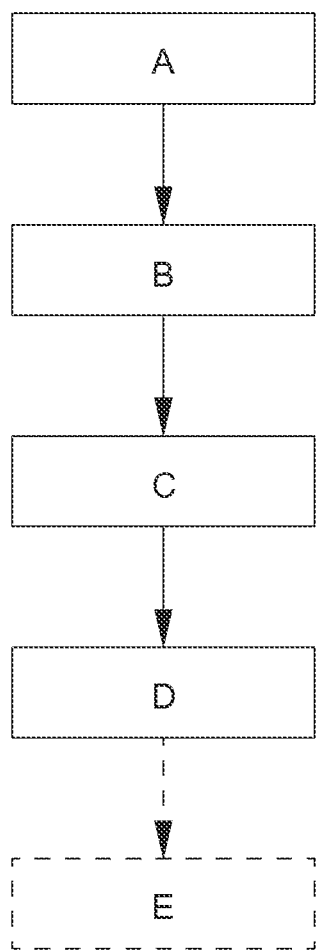
Figure 10:
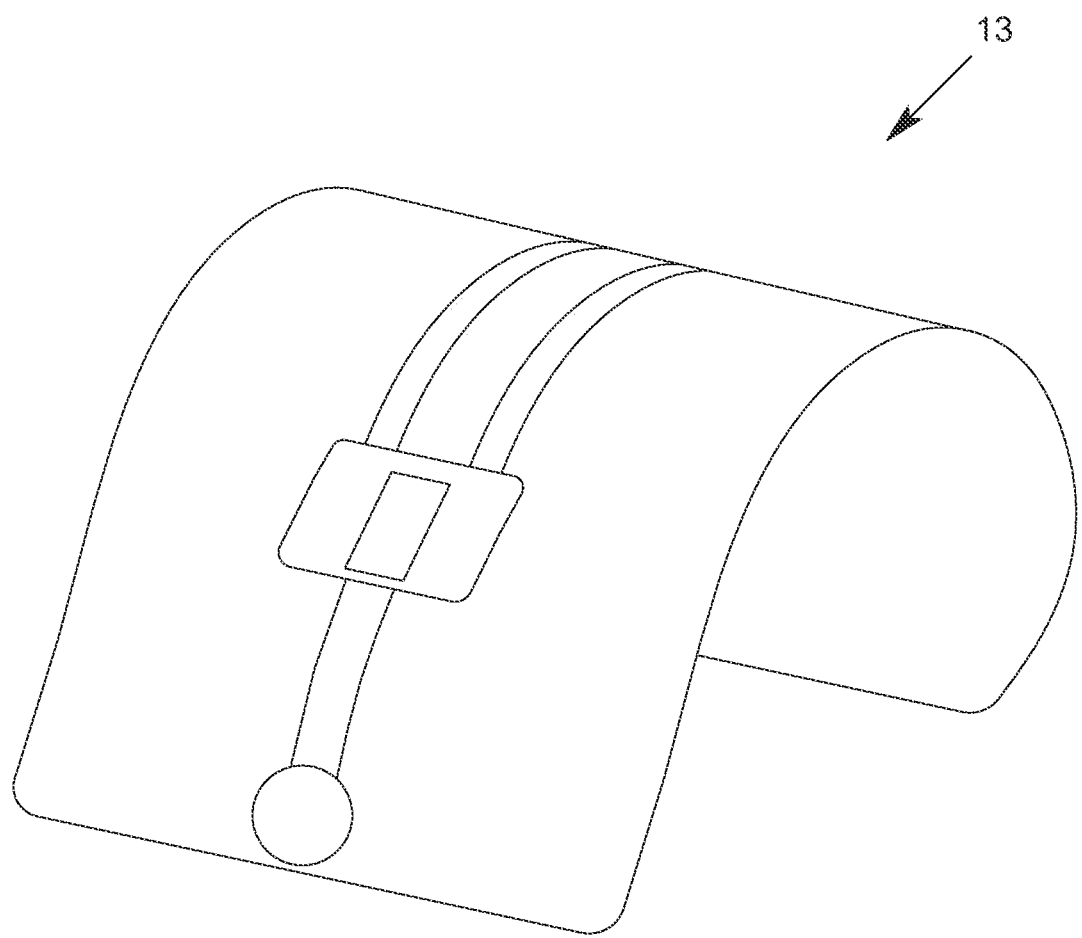
Figure 11:
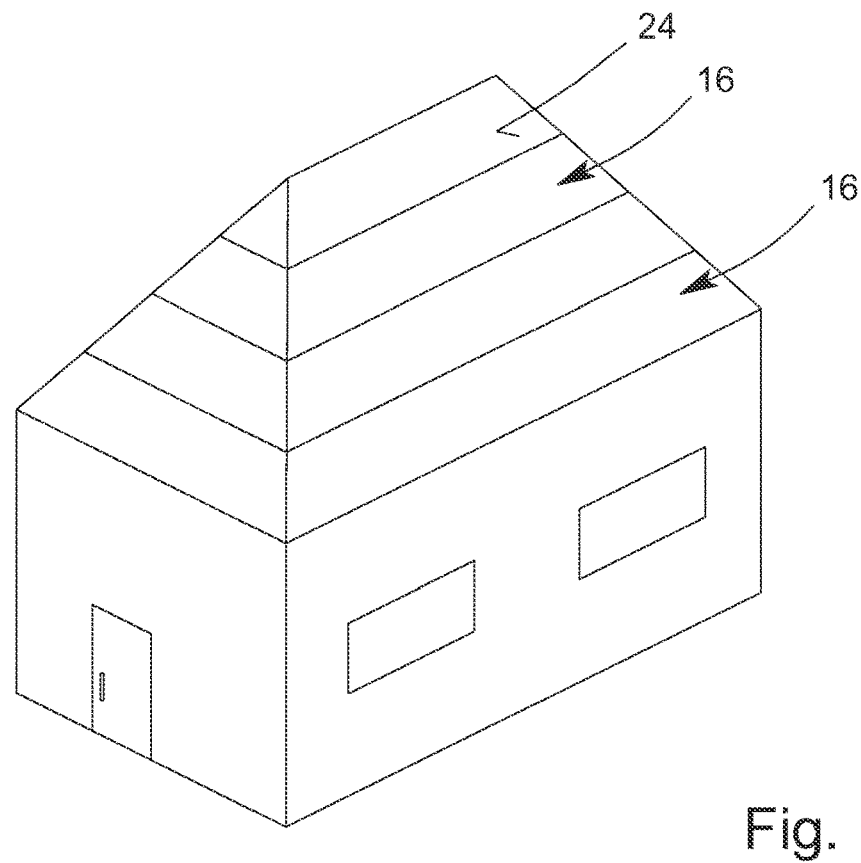
Figure 12:
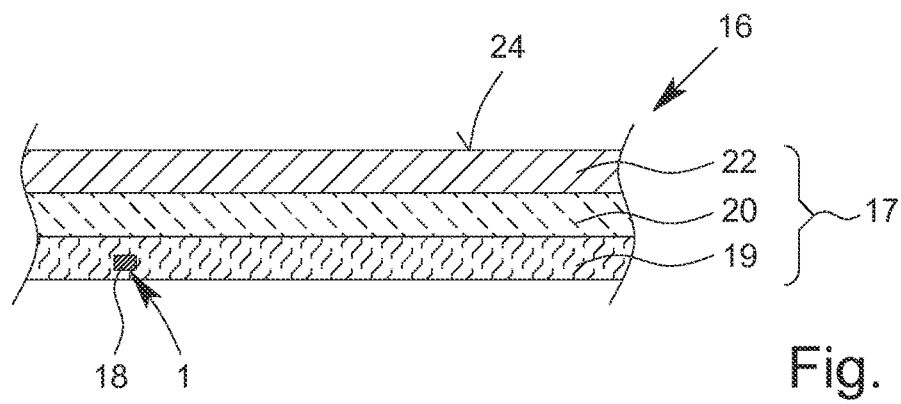
Figure 13:
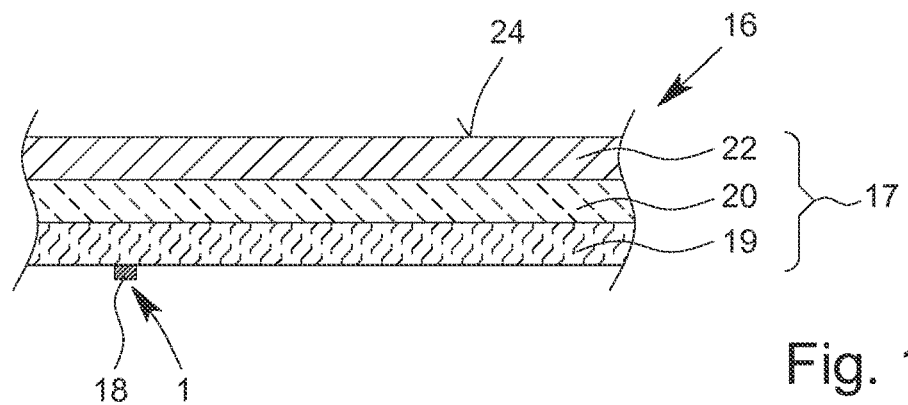
Figure 14:
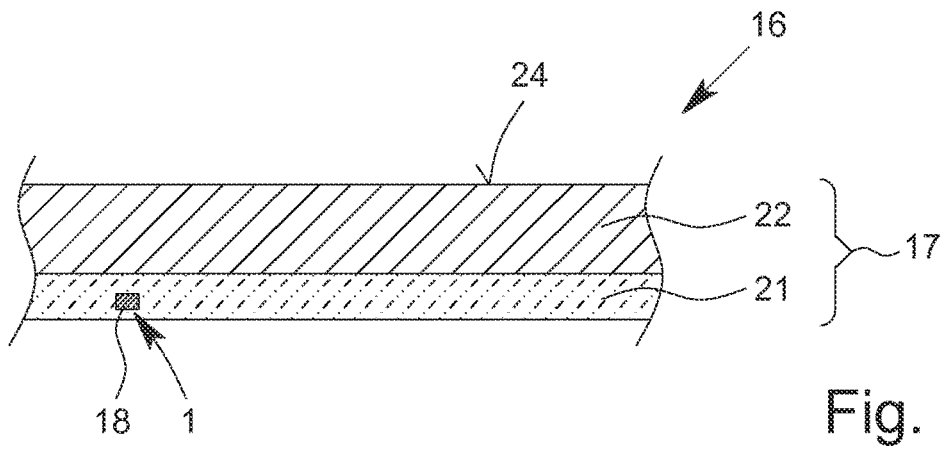
Figure 15:
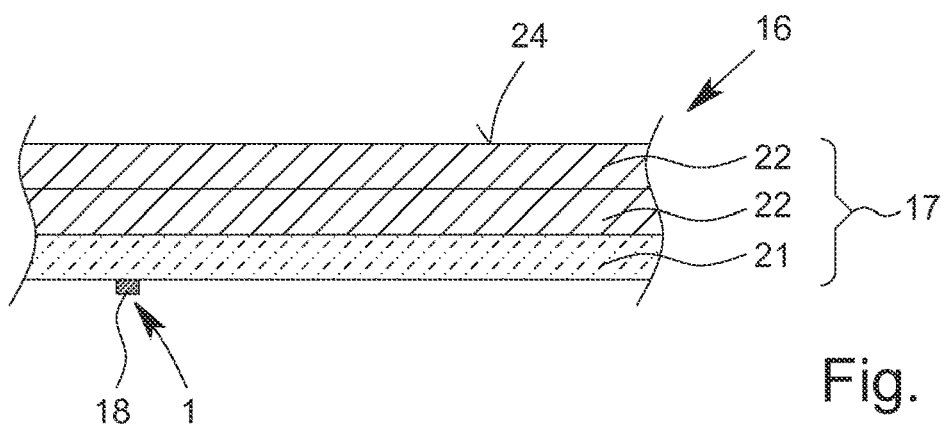
Figure 16:
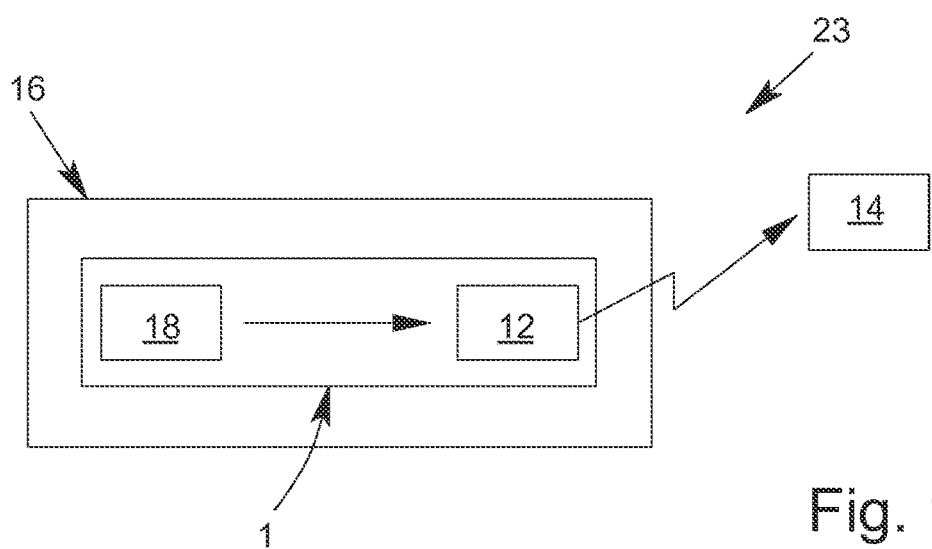
Figure 17:
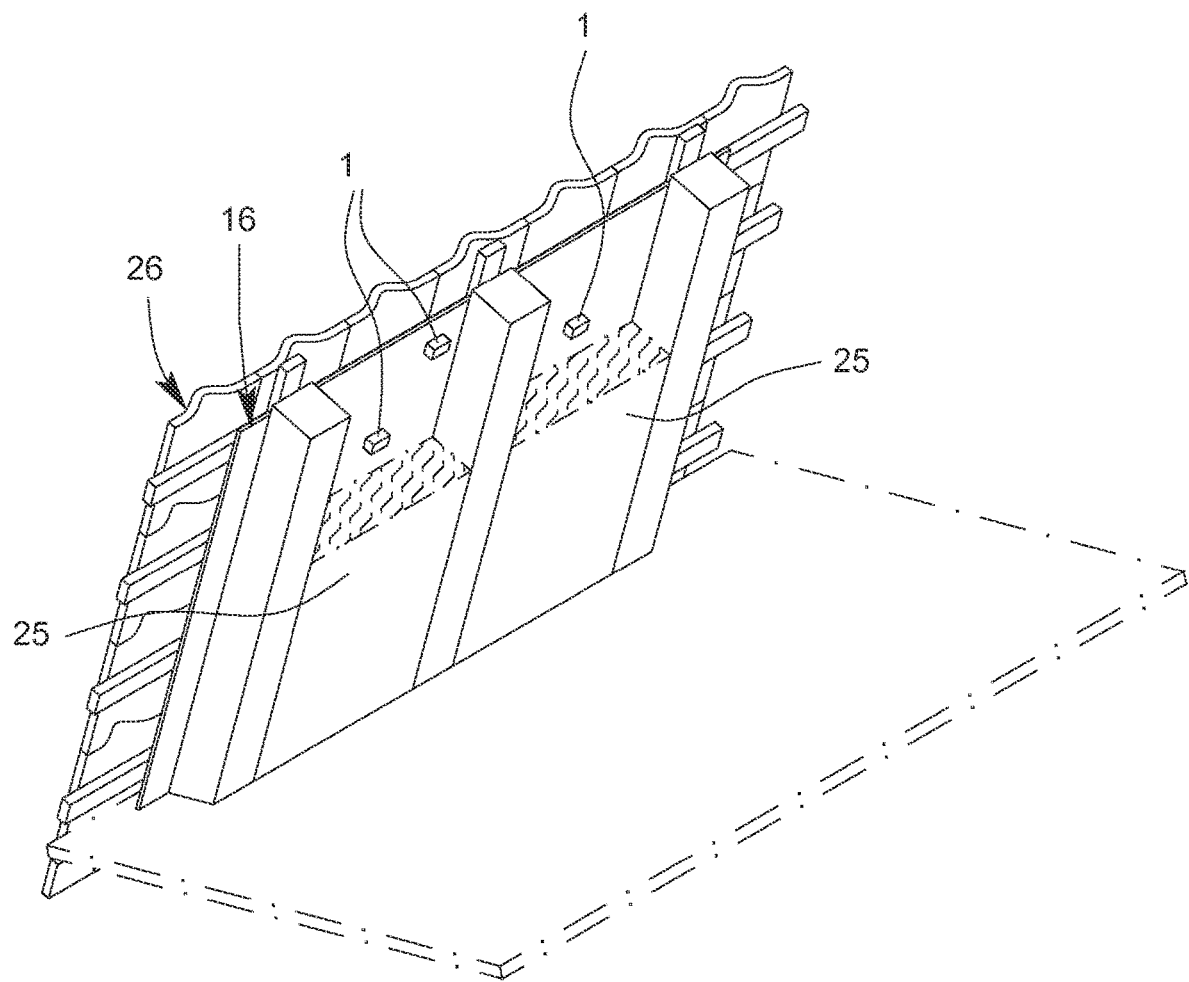

It shows:

FIG. 1 a schematic view of the moisture sensor according to the invention,

FIG. 2 a schematic view of a further embodiment of the moisture sensor according to the invention, FIG. 3 a schematic perspective view of the first electrode, FIG. 4 a schematic perspective view of the second electrode, FIG. 5 a schematic cross-sectional view of a further embodiment of a first electrode, FIG. 6 a schematic cross-sectional view of a further embodiment of a second electrode, FIG. 7 a schematic view of a system, FIG. 8 a schematic view of a further embodiment of the system, FIG. 9 a schematic illustration of the method flow, FIG. 10 a schematic perspective illustration of the RFID transponder, FIG. 11 a schematic perspective illustration of a undercover formed by rows of the construction foil according to the invention, FIG. 12 a schematic cross-sectional view of the construction foil according to the invention, FIG. 13 a schematic cross-sectional view of a further embodiment of the construction foil according to the invention, FIG. 14 a schematic cross-sectional view of a further embodiment of the construction foil according to the invention, FIG. 15 a schematic cross-sectional view of a further embodiment of the construction foil according to the invention, FIG. 16 a schematic illustration of the system according to the invention, and FIG. 17 a schematic perspective illustration of a roofing system comprising a construction foil according to the invention.

Figure 18:
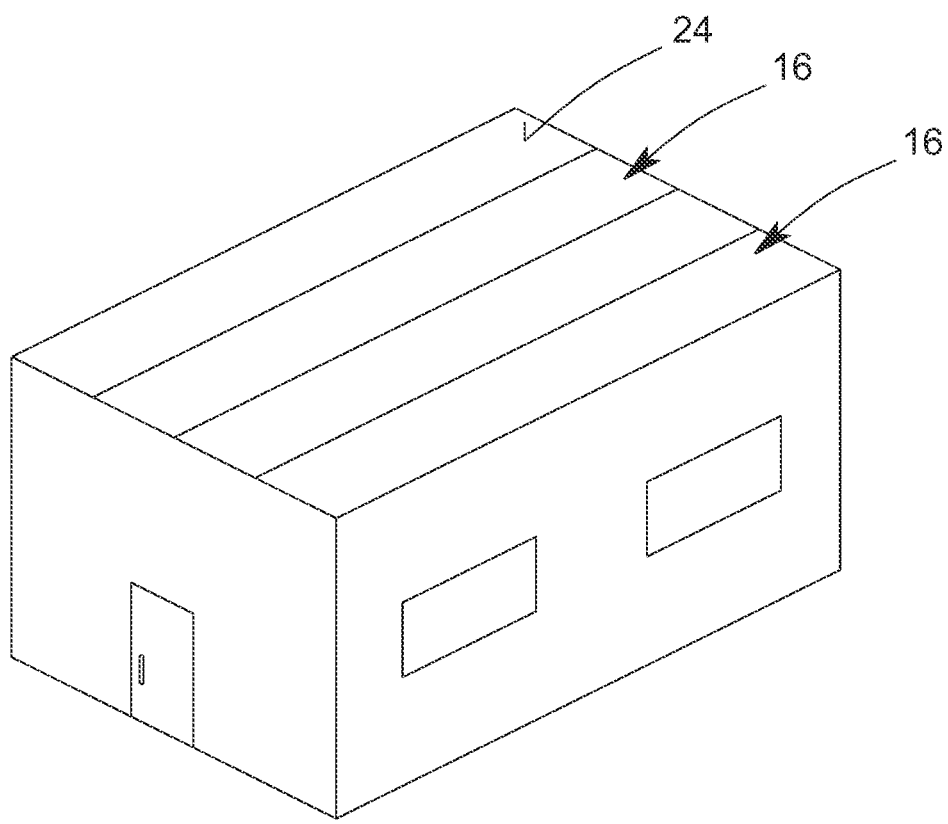
Figure 19:
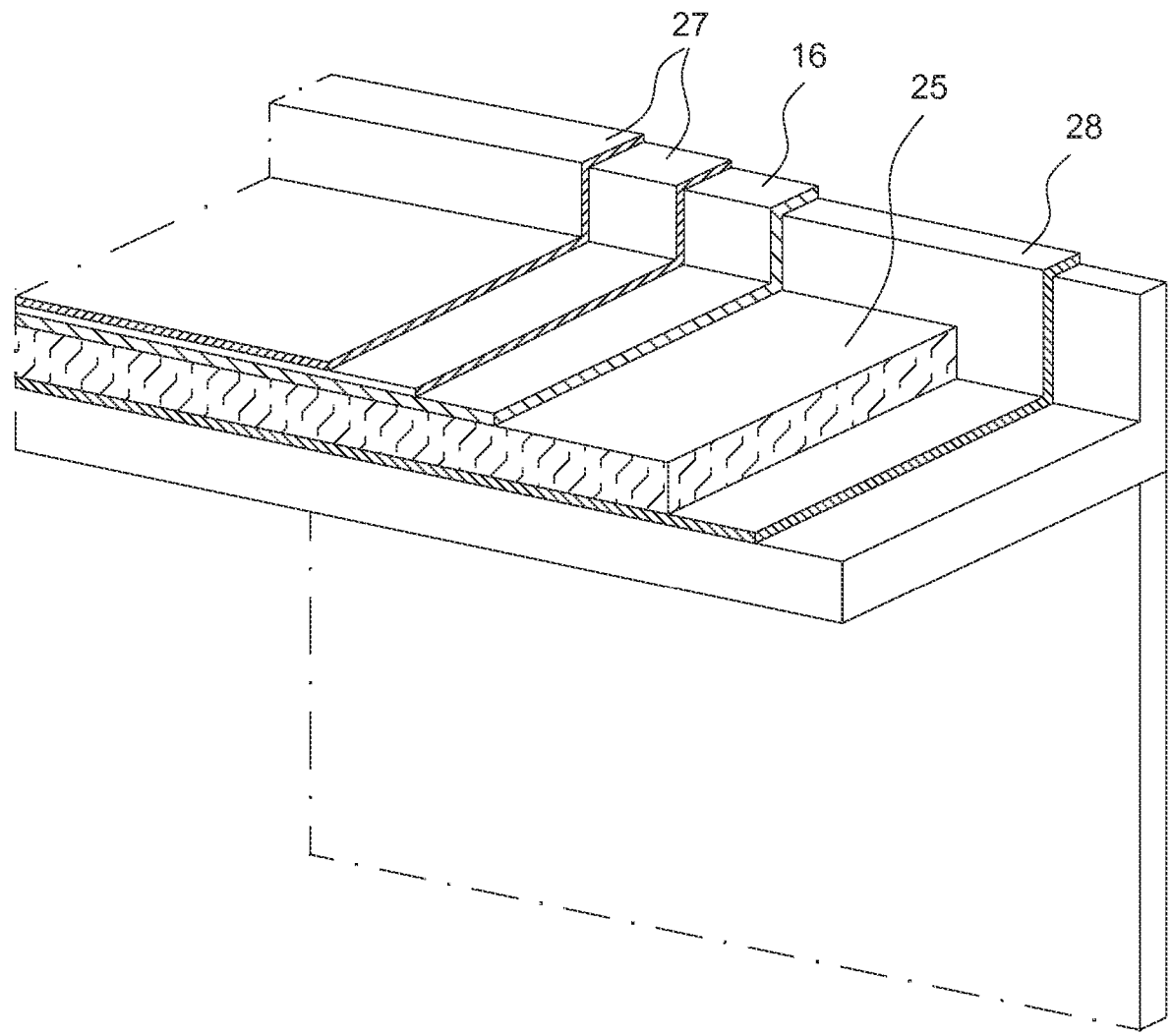

FIG. 18 a schematic perspective illustration of a flat roof cover formed by rows of the construction foil according to the invention, FIG. 19 a schematic illustration of a flat roof comprising a construction foil according to the invention.

FIG. 1 shows a moisture sensor 1 designed to detect moisture with at least two electrodes 2, 4. The first electrode 2 shown in FIG. 1 is designed as an anode and the second electrode 4 as a cathode. FIG. 3 shows that the first electrode 2 comprises a first material 3 at least in some areas on the surface. FIG. 4 shows that the second electrode 4 comprises a second material 5 at least in some areas. In the embodiments shown, it is provided that the second material 5 differs from the first material 3.

In addition, FIG. 2 shows that an electrical voltage is generated when the first material 3 and the second material 5 come into contact with moisture. The electrodes 2, 4 are electrically connected to each other via moisture. The moisture shown in FIG. 2 is a liquid which extends along and/or bridges the free space between the electrodes 2, 4, at least in some areas.

The moisture can form a moisture film on the surface of the electrodes 2, 4 and thus contact the first material 3 and the second material 5. Water may be provided as the moisture to be detected.

FIG. 1 shows that the first electrode 2 and the second electrode 4 are electrically connected to at least one consumer.

In the embodiment shown in FIG. 1, it is provided that a voltage is generated between the first electrode 2 and the second electrode 4 only when the first material 3 of the first electrode 2 and the second material 5 of the second electrode 4 come into contact with moisture. Further, FIGS. 3 and 4 show that the first material 3 and the second material 5 can be provided not only on the surface of the electrodes 2, 4, but also at least regionally inside the electrodes 2, 4.

Furthermore, FIG. 2 shows that the first electrode 2 consists of the first material 3 and the second electrode 4 consists of the second material 5.

Moreover, FIG. 2 shows that the two electrodes 2, 4 form a galvanic element and/or are designed as part of a galvanic element. A galvanic element is ultimately formed when the first material 3 and the second material 5 come into contact with moisture.

Especially, the moisture is designed as an electrolytic solution when in contact with the first material 3 and the second material 5.

FIG. 3 shows that the first material 3 of the first electrode 2 need not be provided on the entire surface of the first electrode 2. In the embodiment example shown in FIG. 3, the first material 3 is provided on a first surface area 6.

Similarly, FIG. 4 shows that the second material 5 is provided on a second surface region 7 of the second electrode 4 which does not extend over the entire surface of the second electrode 4.

In FIG. 2, it is provided that the first electrode 2 and the second electrode 4 each comprise the first material 3 the second material 5 on their entire surface.

Furthermore, FIG. 5 shows that a coating 8 is provided on the first electrode 2 at least in some areas. Similarly, FIG. 6 shows that a coating 8 is provided at least in some areas on the surface of the second electrode 4. The coating 8 is also provided on the first surface area 6 and the second surface area 7.

Not shown is that the coating 8 is designed to protect the electrodes 2, 4 from corrosion and/or mechanical stress, at least in areas.

Furthermore, the coating 8 may be designed to be miscible and/or removable in water.

Furthermore, the coating 8 can also be designed as a corrosion coating.

Alternatively or additionally, the coating 8 can form an electrolyte solution together with moisture on contact with moisture and/or comprise an electrolyte former, especially one that is removable in moisture, so that the electrical voltage arising between the electrodes 2, 4 can be increased.

The resulting electrical voltage can be between 0.5 V to 4 V, preferably between 0.8 V to 1.3 V.

It is not shown that the first material 3 and the second material 5 comprise a metal. Especially, the first material 3 may comprise a negative standard potential and/or the second material 5 may comprise a positive standard potential. Furthermore, the first material 3 may comprise a base metal and/or the second material 5 may comprise a noble metal and/or a metal that is more noble than the first material 3. Thus, it may be provided that zinc is used for the first material 3 and copper is used for the second material 5. Further material combinations of the first material 3 of the second material 5 are zinc and platinum, zinc and gold, zinc and silver, zinc and nickel and/or nickel and platinum.

FIG. 1 further shows that the moisture sensor 1 comprises sensor electronics 9. The sensor electronics 9 can be supplied with electrical energy for operation by the electrical voltage that can be generated between the first electrode 2 and the second electrode 4.

In addition, it is shown in FIG. 1 that the sensor electronics 9 comprise an energy storage device 10. By means of the energy storage device 10, the moisture sensor 1 is arranged to store electrical energy originating from the electrodes 2, 4. In the embodiment provided in FIG. 1, the electrical energy is accumulated, wherein the energy storage device 10 is designed as a capacitor.

Furthermore, FIG. 1 shows that the sensor electronics 9 comprise a voltage increasing device 11. In the embodiment shown, the voltage increasing device 11 is connected to the energy storage device 10 and is fed and/or supplied with electrical energy by the electrical energy of the energy storage device 10.

In another embodiment not shown, it is provided that the voltage increasing device 11 is directly electrically connected to the first and second electrodes 2, 4, and the input voltage of the voltage increasing device 11 is the voltage that can be generated between the electrodes 2, 4. The voltage increasing device 11 can increase the voltage. The increased electrical voltage can be used to operate other components of the sensor electronics 9. In the embodiment example shown in FIG. 1, it is provided that a charge pump is used as the voltage increasing device 11.

Furthermore, according to the embodiment example shown in FIG. 1, the sensor electronics 9 comprises a transmitting device 12 for wireless transmission of information. Both identification data and/or location data, especially GPS signals, can be provided as information.

It is not shown that the transmitting device 12 comprises a, preferably active, RFID transponder 13. An RFID transponder that can be used as a transmitting device 12 is shown in FIG. 10. The RFID transponder 13 shown in FIG. 10 is designed as a flexible element comprising an at least substantially foil-like structure. The first electrode 2 and the second electrode 4 can also be arranged together with the sensor electronics 9 on such a flexible foil and/or flexible printed circuit board.

Furthermore, it is not shown that the distance between the electrodes 2, 4 and/or the width of the free space resulting between the electrodes 2, 4 is between 0.01 mm to 20 cm, preferably between 0.01 mm to 10 cm, even more preferably between 1 mm to 5 cm.

FIGS. 7 and 8 show a system 15 with a moisture sensor 1 and a transmitting device 14. The transmitting device 12 of the moisture sensor 1 can transmit information to the receiving device 14 without contact. In the embodiment shown in FIGS. 7 and 8, it is provided that the receiving device 14 is designed in such a way that the moisture sensor 1 can be localized and/or identified. In the embodiment provided in FIG. 7, the transmitting device 12 of the sensor electronics 9 is connected directly to the first electrode 2 and the second electrode 4 and, for operation, is supplied directly with the electrical voltage that can be generated between the first electrode 2 and the second electrode 4.

In FIG. 8, on the other hand, it is shown that the sensor electronics 9 comprise, in addition to the transmitting device 12, an energy storage device 10 and a voltage increasing device 11. The electrical voltage that can be generated between the electrodes 2, 4 when moisture is detected is first transmitted to the energy storage device 10, accumulated in it, and then fed to the voltage increasing device 11, which increases the voltage. The transmitting device 12 is supplied by the voltage increased by means of the voltage increasing device 11.

It is not shown that the system 15 is designed as an active RFID system, wherein the transmitting device 12 comprises an active RFID transponder 13. It is further not shown that a passive RFID system is and/or can be provided alternatively.

Furthermore, FIG. 9 shows a method for detecting moisture with a moisture sensor 1. In method step A, a moisture, in particular a liquid, comes into contact with the first material 3 of the first electrode 2 and the second material 5 of the second electrode 4. Accordingly, the moisture lies, especially in contact, on the first surface area 6 of the first electrode 2 and the second surface area 7 of the second electrode 4.

In process step B, the coming into contact of the first material 3 and the second material 5 with the moisture generates an electrical voltage and/or an electrical voltage is generated due to an electrochemical reaction. Ultimately, chemical energy is converted into electrical energy.

In addition, in process step C, it is provided that the transmitting device 12 is supplied directly or indirectly for operation with the electrical voltage generated in process step B. In the case of a direct connection of the transmitting device 12, it is provided that the transmitting device 12 is directly electrically connected to the first electrode 2 and the second electrode 4. In the case of an indirect connection, it is provided that further components of the sensor electronics 9, such as an energy storage device 10 and/or a voltage increasing device 11, are electrically connected to the first electrode 2 and the second electrode 4, which subsequently supply the transmitting device 12 with electrical energy.

In process step D, it is on the other hand provided that the transmitting device 12 transmits information, especially information showing location data and/or identification data. It is possible that the transmitting device 12 transmits an acoustic signal. In process step D, the transmitting device 12 transmits the information to the receiving device 14 of the system 15.

Finally, it can optionally be provided in method step E that the receiving device 14 analyzes the information transmitted by the transmitting device 12, especially by means of an allocation means not shown. By means of an analysis via the receiving device 14, the moisture sensor 1 can be identified and/or localized.

FIG. 10 shows the transmitting device 12 designed as an active RFID tag and/or RFID transponder 13 in the form of a flexible foil construction, preferably on a flexible printed circuit board.

Not shown is that the active RFID tag and/or transmitting device is applied to and/or arranged on a rigid and/or inflexible printed circuit board.

Not shown is that a plurality of first electrodes 2 and second electrodes 4 may be provided for a moisture sensor 1, in particular wherein the individual pairs of electrodes (each a first electrode 2 and a second electrode 4) are connected in series and/or in parallel.

FIG. 11 shows a construction foil 16 that can be used as a sub-roofing sheeting, especially as an underlayment and/or sarking sheeting.

FIG. 18 shows that the construction foil 16 can also be used as a flat roof sheeting for sealing a flat roof. For example, further waterproofing sheets or a waterproofing sheet can be laid above the construction foil on the top side 24, facing the weather side, to form a building envelope. It is also possible that indirectly or directly on the top side of the construction foil 16 a gravel fill and/or a greening is provided, which can especially form the top side of the flat roof facing the weather side.

It is not shown that the construction foil can also be used as a facade sheeting and/or vapor sealing.

FIG. 12 shows that the construction foil 16 comprises a single- or multilayer layer structure 17. At least one moisture sensor 1 is provided in and/or on the construction foil 16, which is used to detect moisture.

The moisture sensor 1 is designed as an active pick-up. An active pick-up is characterized by the fact that it provides its own electrical power supply—based on the measuring principle. No external auxiliary energy, especially electrical auxiliary energy, is required.

It is further provided that the moisture sensor 1 comprises at least one electrode 18 and that the electrode 18 is in direct contact with the nonwoven layer 19.

It is not shown that the moisture sensor 1 comprises a humidity sensing element which is in direct contact with the nonwoven layer 19. The humidity sensing element can be integrated on and/or in the nonwoven layer 19.

In FIG. 12, it is shown that the electrode 18 is integrated in the nonwoven layer 19 and/or is arranged in the nonwoven layer 19.

In FIG. 12, it is not shown that a counter electrode is assigned to the electrode 18, and it is especially not shown that the moisture sensor 1 can comprise two electrodes 18. Furthermore, the counter-electrode can also be in non-direct contact with the nonwoven layer 19, but does not have to be. In principle, the counter-electrode can also be arranged outside the construction foil 16, especially formed by the surroundings.

FIG. 13, on the other hand, shows that the electrode 18 of the moisture sensor 1 is arranged on the nonwoven layer 19.

In addition, FIG. 12 shows that the layer structure 17 comprises at least one functional layer 20. Furthermore, FIG. 14 shows that the layer structure 17 comprises at least one support layer 21. In the embodiment example shown in FIG. 14, no nonwoven layer 19 is provided. The electrode 18 of the moisture sensor 1 may have been integrated on and/or in the support layer 21 and/or be in direct contact with the support layer 21.

The top side 24 of the construction foil 16 and/or of the multilayer layer structure 17 faces the weather side—as shown in FIG. 11.

The functional layer 20 shown in FIG. 12 is designed to be open to diffusion, waterproof and breathable. The functional layer 20 can further be designed to be permeable to water vapor, especially due to its design as a microporous membrane. The functional layer 20 can provide the functions essential for a construction foil 16 designed as a roofing foil, especially a sub-roofing foil, and/or for a sub-roofing and/or building envelope.

In the embodiment shown in FIG. 13, it is provided that the functional layer 20 of the construction foil 16, which is designed as a flat roofing sheeting, is designed to be waterproof and diffusion-barrier, especially diffusion-tight. In further embodiments, the construction foil 16 designed as a flat roofing sheeting can also be designed to be vapor-sealing and/or vapor-barrier. The construction foil 16 designed as a flat roofing sheeting can be designed as a bituminous membrane, especially a self-adhesive bituminous membrane, and/or a roof sealing sheeting.

The construction foil 16 and/or the functional layer 20 shown in FIG. 13 comprises an Sd value of greater than or equal to 2 m. In further embodiments, it is provided that the Sd value is from 50 to 2500 m.

It is not shown that a construction foil 16 designed as a facade sheet can be designed to be wind-braking, waterproof, UV-resistant and/or open to diffusion, in particular wherein the construction foil 16 can also be designed as an insulating sheet.

Furthermore, it is not shown that the construction foil 16 can be designed as a vapor sealing and/or vapor barrier, wherein the construction foil 16 designed as a vapor sealing is designed to be diffusion-tight, diffusion-inhibiting, water vapor sealing, water vapor barrier and/or air-tight, preferably water-tight.

The construction foil 16 shown in FIG. 11 is designed to be waterproof, diffusion-open and/or breathable.

In addition, the construction foil 16 shown in FIG. 11 comprises an Sd value of less than or equal to 0.5 m. Especially, the Sd value is 0.03+/−0.02 m.

The nonwoven layer 19 shown in FIG. 12 is a wet-jet reinforced nonwoven layer 19. In the embodiment shown in FIG. 13, the nonwoven layer 19 is a needle-jet reinforced and/or a thermally reinforced nonwoven layer 19. The nonwoven layer 19 may also be designed as a staple fiber nonwoven.

In further embodiments, the nonwoven layer 19 may comprise a polyolefinic nonwoven, a polyester nonwoven, a natural fiber nonwoven, a polypropylene spunbonded nonwoven, a polyamide nonwoven, a polylactide nonwoven (PLA nonwoven), and/or may be manufactured as a close-meshed knitted fabric.

In further embodiments, the support layer 21 shown in FIGS. 14 and 15 can be designed as a nonwoven layer 19. Ultimately, the carrier layer 21 can also assume the functions of the nonwoven layer 19.

In the embodiment shown in FIGS. 14 and 15, it is provided that the moisture sensor 1—in the embodiments shown, the electrode 18 of the moisture sensor 1—is in direct contact with the support layer 21. Accordingly, as previously mentioned, the electrode 18 is arranged in and/or on the support layer 21.

In addition, the layer structures 17 of the embodiments shown in FIGS. 12 to 15 show that the support layer 21 and/or nonwoven layer 19 comprising the moisture sensor 1 and/or the electrode 18 of the moisture sensor 1 is/are arranged on the underside, facing away from the weather side or the top side 24, of the construction foil 16 or the multilayer layer structure 17. Accordingly, on the top side, facing the weather side, at least one further layer 22 is arranged on the support layer 21 and/or nonwoven layer 19 comprising the moisture sensor 1 or the electrode 18 of the moisture sensor 1. The further layer 22 may be designed as a nonwoven layer 19 and/or a functional layer 20.

Accordingly, the nonwoven layer 19 and/or the support layer 21 is not arranged on the top side 24 of the construction foil 16. The nonwoven layer 19 and/or the carrier layer 21 can especially not be waterproof and/or water-permeable.

It should be noted, however, that the support layer 21 and/or nonwoven layer 19 comprising the moisture sensor 1 and/or the electrode 18 of the moisture sensor 1 can also be arranged on the top side, facing the weather side or the top side 24, of the construction foil 16 and/or of the multilayer layer structure 17. In this orientation, the further layer 22, which can preferably be designed as a nonwoven layer 19 and/or functional layer 20, is accordingly arranged on the underside, facing away from the weather side or top side 24, of the construction foil 16 and/or of the multilayer laminate 17.

It is not shown that the nonwoven layer 19 and/or the support layer 21 comprises an electrolyte former which is soluble in water and/or in moisture and/or which is miscible with water and/or moisture. A citric acid powder and/or a powder comprising oxaloacetic acid, mulanic acid, glutaric acid, quinic acid and/or a vitamin C may be provided as the electrolyte former. Especially the powder is fully or partially applied over the surface of the nonwoven layer 19 and/or the support layer 21 and/or provided into the surface. Upon contact with moisture, the powder and/or the electrolyte former can dissolve and especially increase the electrical conductivity of the moisture and/or the moisture coming into contact with the moisture sensor 1 and/or the electrode 18. This can be used for subsequent electrochemical reaction with the electrode 18.

FIG. 1 shows that the moisture sensor 1 comprises sensor electronics 9, wherein the sensor electronics 9 comprise a transmitting device 12 designed to transmit information wirelessly. The transmitting device 12 may transmit an acoustic signal and/or a radio signal designed to transmit information.

FIG. 16 shows a system 23 with a construction foil 16 and a receiving device 14, wherein information from the transmitting device 12 can be transmitted to the receiving device 14 without contact. The receiving device 14 can be designed in such a way that the moisture sensor 1 can be located and/or identified.

Furthermore, FIG. 17 shows that a plurality of moisture sensors 1 are provided in a sub-covering of a roofing comprising the construction foil 16. The moisture sensors 1 can be arranged on the side of the construction foil 16 facing away from the top side 24 and especially—as in the embodiment example shown in FIG. 17—facing the interior of the building and/or an insulation and/or an insulation board 25.

Arranged on the top side 24, a hard roofing 26 may be provided. The system 23 is therefore characterized by the fact that the moisture sensor 1, which detects the moisture in the roofing according to the embodiment example shown in FIG. 17, can also be localized so that the leaking area of the roofing can be repaired in a targeted and purposeful manner to eliminate the leak.

FIG. 19 shows a structure for covering a flat roof. Here, a construction foil 16 is used. In the embodiment shown, the construction foil 16 comprising the moisture sensor 1 is arranged below, facing away from the weather side, at least one waterproofing sheet 27. An insulation board 25 is arranged between a vapor barrier 28 and the construction foil 16. It is not shown that the vapor barrier 28 can also be designed as a construction foil 16 with an integrated moisture sensor 1.

As already mentioned, when used on a flat roof, the moisture sensor 1 and/or the nonwoven layer 19 and/or support layer 21 comprising the moisture sensor 1 can also be arranged above the construction foil 16, facing the weather side and/or the upper side 24. Accordingly, the functional layer 20 faces the roof area and/or faces away from the weather side. With this orientation, a leak in the waterproofing sheet 27 is detected particularly quickly by the moisture sensor 1 arranged directly below it.

Not shown is an arrangement in which the separate vapor barrier 28 can be dispensed with, provided the construction foil 16 itself is vapor sealing and/or designed as a vapor sealing. In this case, the construction foil 16 is arranged between the insulation board 25 on the one hand and the roof area on the other. As a result, in addition to leakage detection by means of the moisture sensor 1, the construction foil 16 also assumes the function of a vapor sealing, wherein leakage at the insulation board 25 can be detected directly. Leakage from the construction foil 16 itself, which is designed as a vapor barrier, can also be detected, wherein the moisture sensor 1 is arranged on the construction foil 16, preferably facing the roof area.

LIST OF REFERENCE SIGNS

1 Moisture sensor
2 First electrode
3 First material
4 Second electrode
5 Second material
6 First surface area
7 Second surface area
8 Coating
9 Sensor electronics
10 Energy storage device
11 Voltage increasing device
12 Transmitting device
13 RFID transponder
14 Receiving device
15 System
16 Construction foil
17 Layer structure
18 Electrode
19 Nonwoven layer
20 Functional layer
21 Support layer
22 Further layer
23 System
24 Top side
25 Insulation board
26 Hard roofing
27 Waterproofing sheet
28 Vapor barrier

The invention claimed is:

1. A construction foil configured as a roof film, a roofing foil, a flat roof sheeting, a building facade sheeting, a building vapor barrier, a sub-roofing sheeting, a building underlayment, or building sarking sheeting, having a single- or multilayer layer structure, comprising:
at least one moisture sensor configured to detect when moisture is present at the construction foil, wherein
the moisture sensor is an active pick-up, and
the moisture sensor comprises at least one electrode, and the electrode is in direct contact with a nonwoven layer.

2. The construction foil according to claim 1, wherein the electrode is arranged on and/or in the nonwoven layer.

3. The construction foil according to claim 1, wherein the layer structure comprises one or more of: at least one functional layer and at least one support layer.

4. The construction foil according to claim 3, wherein one or more of:
the at least one functional layer is diffusion-open, vapor-permeable, waterproof and/or breathable, and
the at least one functional layer and/or the construction foil is diffusion-tight, diffusion-inhibiting, water-vapor-impermeable and/or waterproof.

5. The construction foil according to claim 1, wherein one or more of:
the nonwoven layer is a thermally reinforced and/or needle-jet and/or wet-jet reinforced nonwoven layer,
the nonwoven layer comprises a polyolefinic nonwoven, a polyester nonwoven, a natural fiber nonwoven, a polypropylene spunbonded nonwoven, a polyamide nonwoven, a polylactide nonwoven (PLA nonwoven) and/or is a staple fiber nonwoven and/or as a tightly knitted fabric.

6. The construction foil according to claim 3, wherein the support layer is nonwoven layer.

7. The construction foil according to claim 3, wherein the moisture sensor is in direct contact with the support layer.

8. The construction foil according to claim 1, wherein in an installed state, the moisture sensor is arranged on a top side, facing a weather side, or on a bottom side, facing away from the weather side, of the construction foil.

9. The construction foil according to claim 3, wherein the support layer comprising the moisture sensor and/or the nonwoven layer is arranged on an underside or on a top side, facing away from or toward the weather side, of the construction foil and/or in that at least one further layer is arranged on the top side, facing toward the weather side, on the support layer and/or nonwoven layer comprising the moisture sensor.

10. The construction foil according to claim 1, wherein the nonwoven layer comprises an electrolyte former which is soluble in water and/or miscible with water.

11. The construction foil according to claim 1, wherein the moisture sensor comprises sensor electronics, the sensor electronics comprising a transmitting device configured for wireless transmission of information.

12. A system including the construction foil of claim 1, and a receiving device, wherein information from a transmitting device can be transmitted to the receiving device without contact, wherein the receiving device is configured to locate or identify the moisture sensor.

13. A flexible construction material having multilayer layer structure comprising:
- at least one flexible printed circuit board, the flexible printed circuit board including at least one moisture sensor configured to detect when moisture is present at the flexible construction material, wherein the moisture sensor is an active pick-up, and
- the moisture sensor comprises at least one electrode, and the electrode is embedded in or located directly on a nonwoven layer of the flexible construction material, the nonwoven layer secured to a functional layer, the functional layer being waterproof and breathable.

14. The flexible construction material of claim 13 further comprising a support layer affixed to the functional layer.

15. The flexible construction material of claim 13, wherein the nonwoven layer is a thermally reinforced, a needle-jet, or a wet-jet reinforced nonwoven layer.

16. The flexible construction material of claim 13, wherein the nonwoven layer comprises a polyolefinic nonwoven, a polyester nonwoven, a natural fiber nonwoven, a polypropylene spunbonded nonwoven, a polyamide nonwoven, a polylactide nonwoven (PLA nonwoven) and/or is a staple fiber nonwoven and/or a tightly knitted fabric.

17. The flexible construction material of claim 13, wherein the nonwoven layer comprises an electrolyte former which is soluble in water and/or miscible with water.

18. The flexible construction material of claim 13, wherein the moisture sensor comprises sensor electronics, and the sensor electronics comprise a transmitter configured for wireless transmission of information about sensed moisture.

19. A flexible construction material having multilayer layer structure comprising:
- at least one flexible printed circuit board, the flexible printed circuit board including at least one moisture sensor configured to detect when moisture is present at the flexible construction material, wherein the moisture sensor is an active pick-up, and
- the moisture sensor comprises at least one electrode, and the electrode is embedded in or located directly on a support layer of the flexible construction material, the support layer secured to a further layer, the further layer being: a functional layer, the functional layer being waterproof and breathable, or a nonwoven layer.

20. The flexible construction material of claim 19, further comprising an RFID transponder.

* * * * *